United States Patent
Zhang et al.

(10) Patent No.: US 11,438,930 B2
(45) Date of Patent: *Sep. 6, 2022

(54) TIMING INDICATION FOR A TWO-STEP RANDOM ACCESS CHANNEL PROCEDURE

(71) Applicant: QUALCOMM Incorporated, San Diego, CA (US)

(72) Inventors: Xiaoxia Zhang, San Diego, CA (US); Tao Luo, San Diego, CA (US); Sony Akkarakaran, Poway, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,957

(22) Filed: Jan. 9, 2020

(65) Prior Publication Data

US 2020/0229240 A1 Jul. 16, 2020

Related U.S. Application Data

(60) Provisional application No. 62/791,595, filed on Jan. 11, 2019.

(51) Int. Cl.
*H04L 1/18* (2006.01)
*H04W 74/08* (2009.01)
(Continued)

(52) U.S. Cl.
CPC ...... *H04W 74/0833* (2013.01); *H04B 7/0417* (2013.01); *H04L 1/1812* (2013.01);
(Continued)

(58) Field of Classification Search
CPC ......... H04W 74/0833; H04W 72/1284; H04W 74/006; H04W 74/08
See application file for complete search history.

(56) References Cited

U.S. PATENT DOCUMENTS

2012/0320842 A1* 12/2012 Jeong .................. H04W 74/006
370/329
2014/0050186 A1* 2/2014 Kim .................. H04W 56/0045
370/329
(Continued)

FOREIGN PATENT DOCUMENTS

EP 3379870 A1 9/2018
EP 3576482 A1 12/2019
(Continued)

OTHER PUBLICATIONS

International Search Report and Written Opinion—PCT/US2020/013227—ISA/EPO—dated Apr. 17, 2020.
(Continued)

*Primary Examiner* — Mansour Oveissi
(74) *Attorney, Agent, or Firm* — Holland & Hart LLP

(57) ABSTRACT

Methods, systems, and devices for a two-step random access channel (RACH) procedure are described that may enable a user equipment (UE) and a base station to perform a two-step RACH procedure and begin communications using an accurate timing advance (TA). The UE may send a first RACH message of the two-step RACH procedure to the base station. The base station may determine an accurate TA based on the contents of the first RACH message. The base station may prepare a downlink control message and a corresponding second RACH message to send to the UE. The base station may include scheduling information for the second message and an indication of the TA in the downlink control message. The base station may identify one or more data fields in bits within the downlink control message reserved for information other than the TA and replace the bits with the TA indication.

49 Claims, 16 Drawing Sheets

(51) Int. Cl.
*H04W 56/00* (2009.01)
*H04B 7/0417* (2017.01)
*H04W 72/04* (2009.01)
*H04W 74/00* (2009.01)

(52) U.S. Cl.
CPC ... *H04W 56/0045* (2013.01); *H04W 72/0413* (2013.01); *H04W 74/006* (2013.01)

(56) References Cited

U.S. PATENT DOCUMENTS

| | | | |
|---|---|---|---|
| 2015/0109998 A1* | 4/2015 | Yang | H04W 74/008 370/328 |
| 2018/0098234 A1* | 4/2018 | Kim | H04B 7/0478 |
| 2018/0109976 A1 | 4/2018 | Ly et al. | |
| 2018/0124636 A1 | 5/2018 | Ly et al. | |
| 2018/0124822 A1 | 5/2018 | Wang et al. | |
| 2018/0139787 A1 | 5/2018 | Islam et al. | |
| 2018/0205516 A1* | 7/2018 | Jung | H04L 5/0051 |
| 2018/0235003 A1* | 8/2018 | Wong | H04W 72/042 |
| 2019/0053182 A1* | 2/2019 | Choi | H04W 56/0045 |
| 2019/0090262 A1* | 3/2019 | Yan | H04W 72/042 |
| 2019/0132066 A1* | 5/2019 | Park | H04W 36/00835 |
| 2019/0132882 A1* | 5/2019 | Li | H04L 27/2607 |
| 2019/0335515 A1 | 10/2019 | Chen et al. | |
| 2019/0394824 A1* | 12/2019 | Turtinen | H04W 74/0833 |
| 2020/0053793 A1 | 2/2020 | Loehr et al. | |
| 2020/0107371 A1* | 4/2020 | Kunt | H04L 5/0055 |
| 2020/0288457 A1* | 9/2020 | Hong | H04L 5/0055 |

FOREIGN PATENT DOCUMENTS

| | | |
|---|---|---|
| WO | WO-2018064367 A1 | 4/2018 |
| WO | WO-2018139575 A1 | 8/2018 |

OTHER PUBLICATIONS

Mediatek Inc: "Further Considerations on 2-step RACH", 3GPP Draft, 3GPP TSG-RAN WG2 Meeting #103bis, R2-1813965 Further Considerations on 2-Step RACH, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523430, 7 Pages, Retrieved from the Internet: URL: http://www.3gpp.org/ftp/tsg%5Fran/WG2%5FRL2/TSGR2%5F103bis/Docs/R2%2D1813965%2Ezip [retrieved on Sep. 27, 2018], the whole document.

* cited by examiner

|  | DCI Format Identifier 305 |  | Downlink Assignment Index 325 |
| --- | --- | --- | --- |
|  | New Data Indicator 310 |  | PUCCH TPC Command 330 |
|  | Redundancy Version Identifier 315 |  | PUCCH Resource Indicator 335 |
|  | HARQ Process Number 320 |  | HARQ Timing Indicator 340 |
|  |  |  | Unavailable bits 345 |

300

TIMING INDICATION FOR A TWO-STEP RANDOM ACCESS CHANNEL PROCEDURE

CROSS REFERENCE

The present application for patent claims the benefit of U.S. Provisional Patent Application No. 62/791,595 by ZHANG et al., entitled "TIMING INDICATION FOR A TWO-STEP RANDOM ACCESS CHANNEL PROCEDURE," filed Jan. 11, 2019, assigned to the assignee hereof, and expressly incorporated herein.

BACKGROUND

The following relates generally to wireless communications, and more specifically to timing indication for a two-step random access channel procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station and a UE operating in licensed or in unlicensed spectrum of an NR network may perform a random access procedure in order to complete a handover, adjust a network connection, switch from an idle mode to a connected mode, etc. For example, if a UE is disconnected from the network or otherwise does not have access to uplink or downlink resources, the UE may complete a random access procedure with a base station before receiving or transmitting data. As such, a delay in completion of a random access procedure may cause a delay in subsequent communications. Thus, efficient techniques for random access procedures are desirable.

SUMMARY

The described techniques relate to improved methods, systems, devices, and apparatuses that support timing indication for a two-step random access channel (RACH) procedure. Generally, the described techniques provide for enabling a user equipment (UE) and a base station to perform a two-step RACH procedure and begin communications using an accurate timing advance (TA). For example, a UE may acquire system information (e.g., including remaining minimum system information (RMSI)) from a base station, following which the UE may send a first message of the two-step RACH procedure to the base station. Upon receiving the first RACH message from the UE, the base station may determine an accurate TA based on the contents of the first RACH message. Additionally, the base station may prepare a downlink control message and a corresponding second RACH message to send to the UE in order to complete the RACH procedure. In some cases, the base station may include the TA in the contents of the downlink control message.

In some examples, the base station may identify a set of bits within the downlink control message reserved for information other than the TA (e.g., bits corresponding to a downlink control indicator (DCI) format, downlink assignment index, etc.), and the base station may use at least a portion of the set of bits to indicate the TA. As such, the base station may determine to replace one or more fields of the set of reserved bits with a TA indication. In some examples, the base station may determine to replace all of the reserved bits with the TA indication. Additionally or alternatively, the base station may determine to replace only certain bits from the set of reserved bits. The base station may then transmit the downlink control message and the second RACH message to the UE. In some cases, the UE may send feedback to the base station based on the second RACH message, where the base station may indicate within the second RACH message how such feedback is to be performed. For example, the base station may include one or more of a physical uplink control channel (PUCCH) resource allocation, an uplink grant, or a downlink grant in the second RACH message to the UE, and the UE may use the corresponding information to provide feedback to the base station on the second RACH message.

A method of wireless communications at a UE is described. The method may include transmitting, to a base station, a first message of a two-step RACH procedure, the two-step RACH procedure including the first message and a second message and receiving a downlink control message from the base station, the downlink control message including scheduling information for the second message and an indication of a TA for uplink transmissions from the UE.

An apparatus for wireless communications at a UE is described. The apparatus may include a processor, memory in electronic communication with the processor, and instructions stored in the memory. The instructions may be executable by the processor to cause the apparatus to transmit, to a base station, a first message of a two-step RACH procedure, the two-step RACH procedure including the first message and a second message and receive a downlink control message from the base station, the downlink control message including scheduling information for the second message and an indication of a TA for uplink transmissions from the UE.

Another apparatus for wireless communications at a UE is described. The apparatus may include means for transmitting, to a base station, a first message of a two-step RACH procedure, the two-step RACH procedure including the first message and a second message and receiving a downlink control message from the base station, the downlink control message including scheduling information for the second message and an indication of a TA for uplink transmissions from the UE.

A non-transitory computer-readable medium storing code for wireless communications at a UE is described. The code may include instructions executable by a processor to transmit, to a base station, a first message of a two-step RACH procedure, the two-step RACH procedure including the first message and a second message and receive a downlink control message from the base station, the downlink control message including scheduling information for the second message and an indication of a TA for uplink transmissions from the UE.

Some examples of the method, apparatuses, and non-transitory computer-readable medium described herein may further include operations, features, means, or instructions for determining a transmission timing for an uplink message based on the indication of the TA, and transmitting the uplink message to the base station, the uplink message transmitted according to the transmission timing.

In some examples of the method, apparatuses, and non-transitory computer-readable medium described herein, the uplink message indicates that the two-step RACH procedure may be complete.

Some examples of the method, apparatuses, and non-transitory computer-readable medium described herein may further include operations, features, means, or instructions for identifying a set of bits of the downlink control message reserved for information other than the indication of the TA based on a format of the downlink control message, where at least a portion of the set of bits includes bits indicating the TA.

In some examples of the method, apparatuses, and non-transitory computer-readable medium described herein, the set of bits corresponds to one or more of a DCI format identifier, a new data indicator, a redundancy version, a hybrid automatic repeat request (HARQ) process number, a downlink assignment index, a transmission power control (TPC) command, an uplink control resource information, a feedback timing indicator, or any combination thereof.

In some examples of the method, apparatuses, and non-transitory computer-readable medium described herein, all bits of the set of bits may be used for indicating the TA.

Some examples of the method, apparatuses, and non-transitory computer-readable medium described herein may further include operations, features, means, or instructions for receiving the downlink control message based on a cell radio network temporary identifier (C-RNTI) associated with the UE.

Some examples of the method, apparatuses, and non-transitory computer-readable medium described herein may further include operations, features, means, or instructions for monitoring for the second message from the base station based on the scheduling information, where the second message includes at least one of a PUCCH resource information, an uplink grant, a downlink grant, or any combination thereof.

Some examples of the method, apparatuses, and non-transitory computer-readable medium described herein may further include operations, features, means, or instructions for transmitting, to the base station, an indication of feedback for the second message based on the monitoring, where the indication of feedback may be transmitted in a PUCCH via resources indicated by the PUCCH resource information.

Some examples of the method, apparatuses, and non-transitory computer-readable medium described herein may further include operations, features, means, or instructions for transmitting, to the base station, an indication of feedback for the second message based on the monitoring, where the indication of feedback may be transmitted in a physical uplink shared channel (PUSCH) via resources indicated by the uplink grant.

Some examples of the method, apparatuses, and non-transitory computer-readable medium described herein may further include operations, features, means, or instructions for monitoring for a downlink shared channel from the base station based on the downlink grant, and transmitting, to the base station, an indication of feedback for the downlink shared channel and the second message, where the indication of feedback may be transmitted in response to the downlink shared channel.

Some examples of the method, apparatuses, and non-transitory computer-readable medium described herein may further include operations, features, means, or instructions for monitoring for the second message from the base station based on the scheduling information, and transmitting an uplink message transmitted to the base station, the uplink message including feedback information for the second message.

In some examples of the method, apparatuses, and non-transitory computer-readable medium described herein, the downlink control message indicates transmission information for the uplink message, the transmission information including one or more of a TPC command, uplink control resource information, a feedback timing indicator, a redundancy version, or any combination thereof.

Some examples of the method, apparatuses, and non-transitory computer-readable medium described herein may further include operations, features, means, or instructions for identifying RMSI for the UE, where the uplink message may be transmitted according to a fixed timing indicated by the RMSI for the UE.

Some examples of the method, apparatuses, and non-transitory computer-readable medium described herein may further include operations, features, means, or instructions for identifying RMSI for the UE, where the RMSI indicates a granularity for the indication of the TA in the downlink control message.

Some examples of the method, apparatuses, and non-transitory computer-readable medium described herein may further include operations, features, means, or instructions for receiving a refined TA from the base station via a medium access control element (MAC CE), and transmitting a second uplink message to the base station in accordance with the refined TA.

In some examples of the method, apparatuses, and non-transitory computer-readable medium described herein, the indication of the TA for uplink transmissions from the UE included in the downlink control message indicates that the TA may be to be included in the second message.

In some examples of the method, apparatuses, and non-transitory computer-readable medium described herein, the indication of the TA for uplink transmissions from the UE included in the downlink control message indicates a relative TA with respect to a previous TA for the UE.

Some examples of the method, apparatuses, and non-transitory computer-readable medium described herein may further include operations, features, means, or instructions for receiving the second message via a broadcast transmission or a unicast transmission from the base station based on the scheduling information, where the second message may be addressed to a C-RNTI associated with the UE.

Some examples of the method, apparatuses, and non-transitory computer-readable medium described herein may further include operations, features, means, or instructions for receiving one or more retransmissions of the second message from the base station, and determining feedback information for the second message based on the second message and the one or more retransmissions of the second message.

Some examples of the method, apparatuses, and non-transitory computer-readable medium described herein may further include operations, features, means, or instructions for identifying a set of resources for transmission of the second message based on the scheduling information received in the downlink control message, monitoring the set of resources for the second message from the base station based on the scheduling information, determining a decoding failure of the second message based on monitoring the set of resources and the scheduling information, and refraining from performing an additional RACH procedure based on the decoding failure and the scheduling information.

A method of wireless communications at a base station is described. The method may include receiving, from a UE, a first message of a two-step RACH procedure, the two-step RACH procedure including the first message and a second message, transmitting a downlink control message to the UE, the downlink control message including scheduling information for the second message and an indication of a TA for uplink transmissions from the UE, and monitoring for an uplink message from the UE based on the TA.

An apparatus for wireless communications at a base station is described. The apparatus may include a processor, memory in electronic communication with the processor, and instructions stored in the memory. The instructions may be executable by the processor to cause the apparatus to receive, from a UE, a first message of a two-step RACH procedure, the two-step RACH procedure including the first message and a second message, transmit a downlink control message to the UE, the downlink control message including scheduling information for the second message and an indication of a TA for uplink transmissions from the UE, and monitor for an uplink message from the UE based on the TA.

Another apparatus for wireless communications at a base station is described. The apparatus may include means for receiving, from a UE, a first message of a two-step RACH procedure, the two-step RACH procedure including the first message and a second message, transmitting a downlink control message to the UE, the downlink control message including scheduling information for the second message and an indication of a TA for uplink transmissions from the UE, and monitoring for an uplink message from the UE based on the TA.

A non-transitory computer-readable medium storing code for wireless communications at a base station is described. The code may include instructions executable by a processor to receive, from a UE, a first message of a two-step RACH procedure, the two-step RACH procedure including the first message and a second message, transmit a downlink control message to the UE, the downlink control message including scheduling information for the second message and an indication of a TA for uplink transmissions from the UE, and monitor for an uplink message from the UE based on the TA.

Some examples of the method, apparatuses, and non-transitory computer-readable medium described herein may further include operations, features, means, or instructions for receiving the uplink message from the UE based on the monitoring, the uplink message received according to the TA and indicates that the two-step RACH procedure may be complete.

Some examples of the method, apparatuses, and non-transitory computer-readable medium described herein may further include operations, features, means, or instructions for identifying a set of bits of the downlink control message reserved for information other than the indication of the TA based on a format of the downlink control message, and including bits indicating the TA in at least a portion of the set of bits of the downlink control message reserved for information other than the indication of the TA.

In some examples of the method, apparatuses, and non-transitory computer-readable medium described herein, the set of bits corresponds to one or more of a DCI format identifier, a new data indicator, a redundancy version, a HARQ process number, a downlink assignment index, a TPC command, uplink control resource information, a feedback timing indicator, or any combination thereof.

Some examples of the method, apparatuses, and non-transitory computer-readable medium described herein may further include operations, features, means, or instructions for including bits indicating the TA as all bits of the set of bits.

Some examples of the method, apparatuses, and non-transitory computer-readable medium described herein may further include operations, features, means, or instructions for transmitting the downlink control message based on a C-RNTI associated with the UE.

Some examples of the method, apparatuses, and non-transitory computer-readable medium described herein may further include operations, features, means, or instructions for transmitting the second message to the UE based on the scheduling information, where the second message includes at least one of a PUCCH resource information, an uplink grant, a downlink grant, or any combination thereof.

Some examples of the method, apparatuses, and non-transitory computer-readable medium described herein may further include operations, features, means, or instructions for receiving, from the UE, an indication of feedback for the second message in a PUCCH via resources indicated by the PUCCH resource information.

Some examples of the method, apparatuses, and non-transitory computer-readable medium described herein may further include operations, features, means, or instructions for receiving, from the UE, an indication of feedback for the second message in a PUSCH via resources indicated by the uplink grant.

Some examples of the method, apparatuses, and non-transitory computer-readable medium described herein may further include operations, features, means, or instructions for transmitting a downlink shared channel to the UE based on the downlink grant, and receiving, from the UE, an indication of feedback for the downlink shared channel and the second message, where the indication of feedback may be received in response to the downlink shared channel.

Some examples of the method, apparatuses, and non-transitory computer-readable medium described herein may further include operations, features, means, or instructions for transmitting the second message to the UE based on the scheduling information, where the uplink message received from the UE includes feedback information for the second message.

In some examples of the method, apparatuses, and non-transitory computer-readable medium described herein, the downlink control message indicates transmission information for the uplink message, the transmission information including one or more of a TPC command, uplink control resource information, a feedback timing indicator, a redundancy version, or any combination thereof.

Some examples of the method, apparatuses, and non-transitory computer-readable medium described herein may further include operations, features, means, or instructions for transmitting, to the UE, RMSI for the UE, the RMSI indicated a fixed timing for the uplink message.

Some examples of the method, apparatuses, and non-transitory computer-readable medium described herein may further include operations, features, means, or instructions for transmitting, to the UE, RMSI for the UE, where the RMSI indicates a granularity for the indication of the TA in the downlink control message.

Some examples of the method, apparatuses, and non-transitory computer-readable medium described herein may further include operations, features, means, or instructions for transmitting a refined TA to the UE via a MAC CE, and receiving a second uplink message from the UE in accordance with the refined TA.

In some examples of the method, apparatuses, and non-transitory computer-readable medium described herein, the indication of the TA for uplink transmissions from the UE included in the downlink control message indicates that the TA may be to be included in the second message.

Some examples of the method, apparatuses, and non-transitory computer-readable medium described herein may further include operations, features, means, or instructions for transmitting the second message to the UE, the second message including the indication of the TA.

In some examples of the method, apparatuses, and non-transitory computer-readable medium described herein, the indication of the TA for uplink transmissions from the UE included in the downlink control message indicates a relative TA with respect to a previous TA for the UE.

Some examples of the method, apparatuses, and non-transitory computer-readable medium described herein may further include operations, features, means, or instructions for transmitting the second message via a broadcast transmission or a unicast transmission from the base station based on the scheduling information, where the second message may be addressed to a C-RNTI associated with the UE.

Some examples of the method, apparatuses, and non-transitory computer-readable medium described herein may further include operations, features, means, or instructions for transmitting one or more retransmissions of the second message to the UE, and monitoring for feedback information for the second message based on the second message and the one or more retransmissions of the second message.

DETAILED DESCRIPTION

Figure 1:
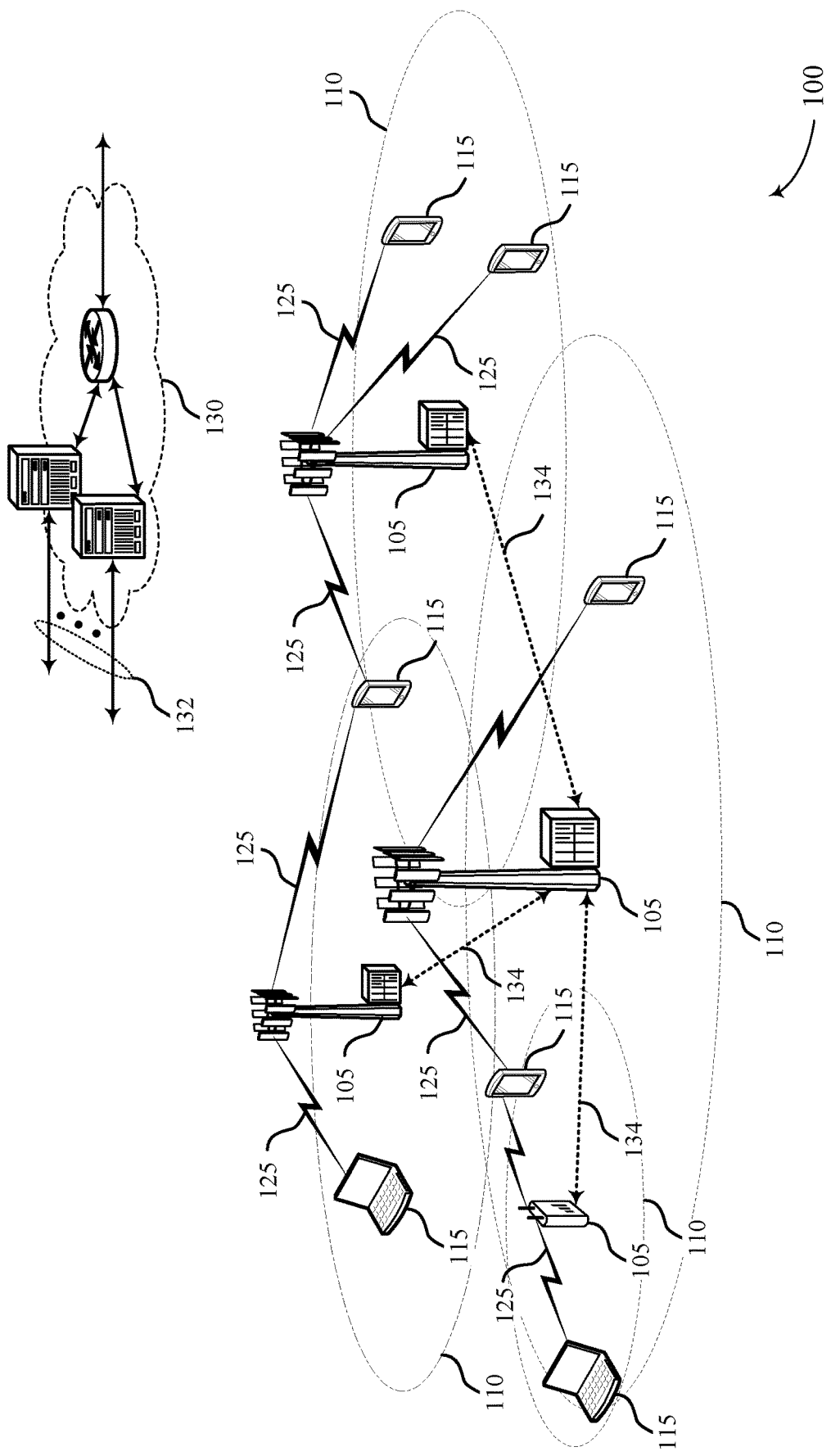
FIG. 1 illustrates an example of a wireless communications system that supports timing indication for a two-step random access channel (RACH) procedure in accordance with aspects of the present disclosure.

Wireless devices operating within a New Radio (NR) network may use a two-step random access channel (RACH) procedure to perform a handover, adjust a network connection, switch from an idle mode to a connected mode, etc. For example, a user equipment (UE) may acquire system information (e.g., including remaining minimum system information (RMSI)) from a base station, following which the UE may send a first RACH message (e.g., msgA) to the base station including a RACH access request (e.g., RACH preamble). In some cases, the UE may transmit communications to the base station using a timing advance (TA) which may account for delays in transmissions sent to the base station. Upon receiving the first RACH message from the UE, the base station may determine an accurate TA based on the contents of the first RACH message and may prepare a second RACH message (e.g., msgB) to send to the UE in order to complete the RACH procedure. In some cases, the base station may send a downlink control message (e.g., physical downlink control channel (PDCCH) message) corresponding to the second RACH message, which may include information for processing the second RACH message. Additionally, the base station may include the determined TA in the contents of the downlink control message, such that the UE may obtain timing information from the downlink control message. Accordingly, the UE may determine that the RACH procedure is complete if the UE is able to decode the downlink control message but is unable to decode the second RACH message.

In some cases, the base station may identify a set of reserved bits within the downlink control message that may not be used by the UE to decode the second RACH message (e.g., bits corresponding to a downlink control indicator (DCI) format or downlink assignment index). As such, the base station may determine to replace one or more data fields in the set of reserved bits with the TA indication. In some examples, the base station may determine to replace all of the reserved bits with the TA indication, which may allow the TA to maintain a defined granularity or resolution (e.g., using a defined number of bits). In some cases, replacing all of the reserved bits may involve replacing information regarding hybrid automatic repeat request (HARQ) feedback (e.g., acknowledgement/negative acknowledgement (ACK/NACK) feedback). Therefore, the UE may be unable to send feedback to the base station based on the downlink control channel. However, the UE may send feedback to the base station based on the second RACH message, where the base station may indicate within the second RACH message how such feedback is to be performed. For example, the base station may include one or more of a physical uplink control channel (PUCCH) resource allocation, an uplink grant, or a downlink grant in the second RACH message to the UE, and the UE may use the corresponding information to provide feedback to the base station based on the second RACH message.

In some cases, the base station may determine to replace only some bits from the set of reserved bits in the downlink control channel. For example, the base station may determine to request ACK/NACK feedback from the UE based on the downlink control channel. Accordingly, the base station may determine to not replace one or more fields from the reserved bits that may enable the UE to report feedback based on the downlink control channel (e.g., a PUCCH resource indicator, a HARQ feedback timing indicator, etc.). In some cases, when including feedback information in the downlink control message, the base station may still include the TA indication using the defined number of bits.

Additionally or alternatively, the base station may determine to not replace data fields within the downlink control message such that the base station may no longer be able to transmit the TA indication using the defined number of bits. As such, the base station may determine to adjust the TA indication to fit within the available reserved bits by reducing the granularity of the TA indication or by indicating a relative TA instead of an absolute TA. If the base station determines to adjust the TA granularity, the base station may indicate the adjusted granularity in the RMSI and may refine the TA subsequent to the two-step RACH according to the defined granularity (e.g., via a medium access control (MAC) control element (CE)). Additionally or alternatively, the base station may determine that the TA indication size is beyond the range which may be indicated in the downlink control channel and may use the TA indication to alert the UE (e.g., via a codepoint) that the second RACH message is to contain the TA information, instead of the downlink control message. Accordingly, the base station may also indicate whether or not the UE is allowed to transmit NACK without decoding the second RACH message for the correct TA.

Aspects of the disclosure are initially described in the context of wireless communications systems. Aspects of the disclosure are further illustrated by and described with reference to a PDCCH message, a process flow, apparatus diagrams, system diagrams, and flowcharts that relate to timing indication for a two-step random access channel procedure.

FIG. 1 illustrates an example of a wireless communications system 100 that supports timing indication for a two-step random access channel procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless devices operating in licensed or in unlicensed spectrum within an NR network may participate in a two-step RACH procedure to reduce delay compared to a four-step RACH procedure (e.g., when performing LBT procedures). In some cases, the two-step RACH procedure may operate regardless of whether a wireless device (e.g., a UE 115) has a valid TA. For example, a UE 115 may use a valid TA to coordinate the timing of its transmissions to a base station 105 (e.g., to account for propagation delay) and may therefore receive the valid TA as part of the two-step RACH procedure if the current TA is not valid. Additionally, the two-step RACH procedure may be applicable to any cell size, may apply to both contention-based and contention-free RACH procedures, and may combine multiple RACH messages from a four-step RACH procedure.

For example, a first RACH message (e.g., msgA), sent from a UE 115 to a base station 105, may combine the contents of a RACH msg1 and msg3 from four-step RACH. Additionally, msgA may include a RACH preamble and a physical uplink shared channel (PUSCH) carrying a payload with the contents of the message (e.g., equivalent to msg3), where the preamble and the payload may be transmitted on separate waveforms. In some cases, the base station 105 may transmit a downlink control channel (e.g., PDCCH) and a corresponding second RACH message (e.g., msgB) to the UE 115, where msgB may combine the equivalent contents of a RACH msg2 and msg4 from four-step RACH. In some examples of two-step RACH, a base station 105 may transmit msgB using either broadcast methods (e.g., targeting multiple UEs 115) or unicast methods (e.g., targeting a specific UE 115). In some cases, a UE 115 may have a valid cell radio network temporary identifier (C-RNTI), and a base station 105 may therefore determine to use unicast transmissions when communicating with the UE 115. For example, a UE 115 may transmit its C-RNTI to a base station 105 as part of msgA, and the base station may then use the C-RNTI in future communications (e.g., msgB) to address the communications to the UE 115.

In order to ensure that a UE 115 has a valid TA, a base station 105 may determine a TA from the preamble transmission of msgA and may transmit the determined TA to the UE 115 using msgB transmissions. In some examples, a TA indication may be transmitted with a defined granularity or resolution, where the base station 105 may transmit the TA using a defined number of bits to achieve the defined granularity. In some cases, if the base station 105 uses the msgB payload to transmit an indication of a TA, the UE 115 may decode msgB in order to obtain the TA. As such, if the UE 115 fails to decode msgB, the UE 115 may fail to obtain the TA indication. As a result, the UE 115 may receive a retransmission of msgB or restart the RACH procedure after the response window for msgB expires. Accordingly, there may be delays associated with including the TA indication within the payload for msgB.

Therefore, a base station 105 may determine to include the TA indication within the PDCCH corresponding to msgB. In some cases, the base station 105 may identify a set of reserved bits within the PDCCH that may not be used to correctly receive and decode msgB. Thus, the base station 105 may replace one or more fields in the set of reserved bits with the TA indication. In some examples, the base station 105 may determine to replace all of the reserved bits with the TA indication, thereby preserving the defined granularity of the TA. Additionally or alternatively, the base station 105 may determine to replace only a part of the reserved bits with the TA indication to transmit feedback control information to the UE 115 within the PDCCH. In some examples where the base station 105 replaces a part of the reserved bits, the number of reserved bits available to be replaced may be greater than or equal to the number of defined bits for the TA indication, in which case the base station 105 may replace the available reserved bits with the TA indication and maintain the defined granularity.

Additionally or alternatively, the available bits may be less than the number of defined bits for the TA indication. Accordingly, the base station 105 may determine to adjust the TA indication to fit within the available bits by adjusting the granularity of the TA indication or by indicating a TA that is relative to a TA from a previous uplink timing (e.g., instead of indicating an absolute TA). In some examples, the base station 105 may determine the TA indication is beyond the range which may be indicated in the PDCCH. The base station 105 may therefore indicate in the PDCCH that the TA indication is contained within the payload of msgB instead.

Figure 2:
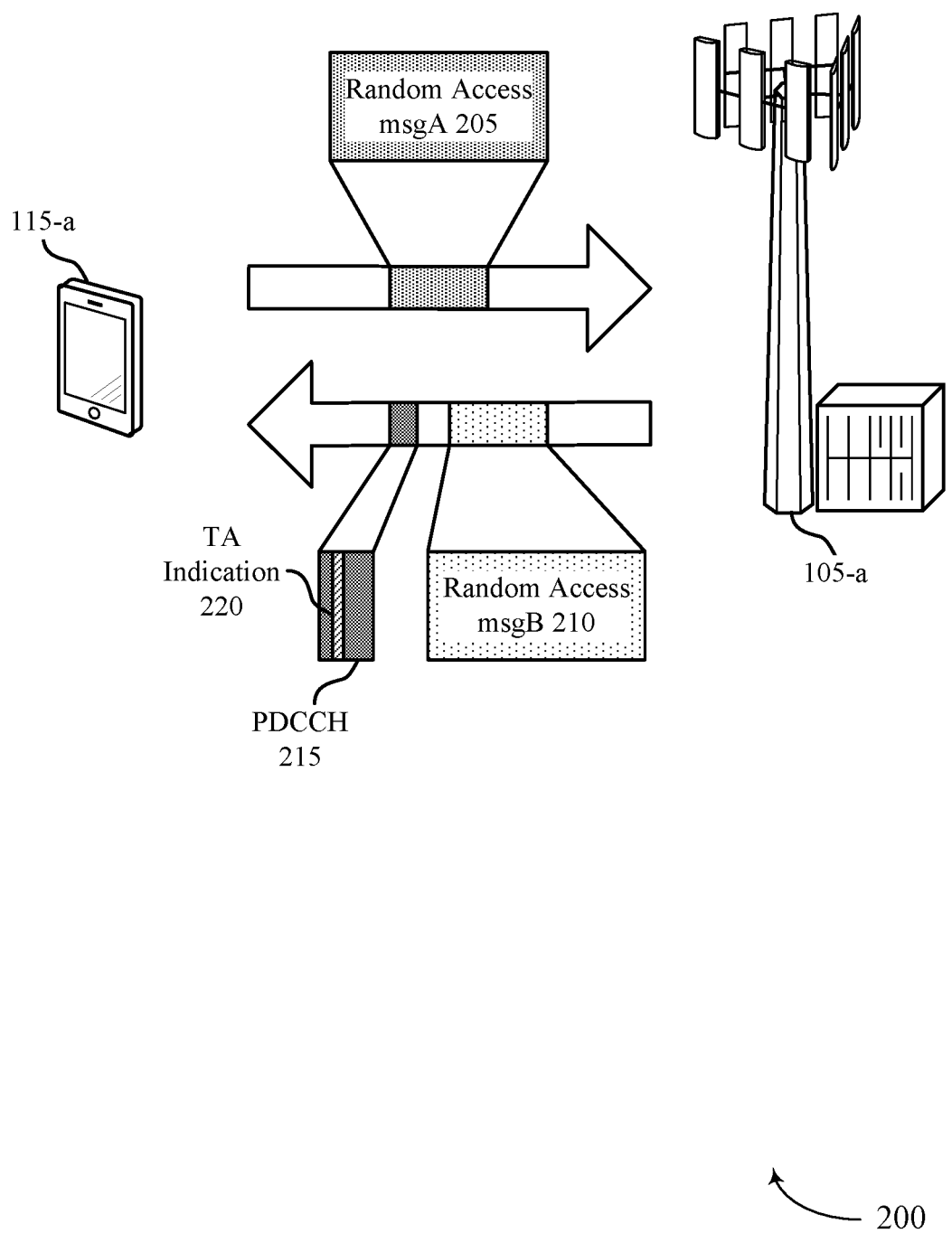
FIG. 2 illustrates an example of a wireless communications system that supports timing indication for a two-step RACH procedure in accordance with aspects of the present disclosure.

FIG. 2 illustrates an example of a wireless communications system 200 that supports timing indication for a two-step random access channel procedure in accordance with aspects of the present disclosure. In some examples, wireless communications system 200 may implement aspects of wireless communication system 100 and may include a UE 115-*a* and a base station 105-*a*, which may be examples of a UE 115 and a base station 105 described with reference to FIG. 1. As discussed with reference to FIG. 1, UE 115-*a* may initiate a two-step RACH procedure by signaling a random access msgA 205 to base station 105-*a*. In some cases, the RACH procedure may be contention-based or a contention-free RACH procedure. In some examples, random access msgA 205 may include a random access preamble and a payload message (e.g., PUSCH), which may be sent on separate waveforms. Additionally, base station 105-*a* may respond to random access msgA 205 by transmitting a random access msgB 210 to UE 115-*a*, using either unicast or broadcast methods. In some examples, UE 115-*a* may not have a valid TA to communicate with base station 105-*a*. Therefore, base station 105-*a* may determine a TA based on the transmitted preamble and may transmit the TA in a TA indication 220 associated with random access msgB 210. In some cases, base station 105-*a* may transmit a PDCCH 215 corresponding to random access msgB 210, and PDCCH 215 may include the TA indication 220 as well as scheduling information for random access msgB 210. As PDCCH 215 may include scheduling information for random access msgB 210, base station 105-*a* may transmit PDCCH 215 before random access msgB 210.

In some examples, UE 115-*a* may initiate a two-step RACH procedure to complete a handover, to correct out-of-sync communications, to request scheduled resources, etc., and in some cases may have a valid C-RNTI. As such, UE 115-*a* may include its C-RNTI in the payload of random access msgA 205, and base station 105-*a* may address both PDCCH 215 and random access msgB 210 to the C-RNTI. Additionally, base station 105-*a* may include a TA indication 220 within PDCCH 215, such that UE 115-*a* may be able to begin communications with base station 105-*a* even if UE 115-*a* is unable to decode random access msgB 210. Accordingly, UE 115-*a* may both resolve a contention resolution procedure and may correct its TA by detecting PDCCH 215. As such, UE 115-*a* may not perform another RACH attempt (e.g., RACH procedure) if UE 115-*a* fails to decode random access msgB 210, as long as UE 115-*a* successfully decodes PDCCH 215. In some examples, this procedure may reduce latency (e.g., by eliminating the time it may take to complete another RACH attempt) and may reduce the network load (e.g., due to fewer RACH attempts).

In some cases, base station 105-*a* may include TA indication 220 on DCI (e.g., DCI format 1_0) within PDCCH 215. Further, base station 105-*a* may include TA indication 220 on a defined set of bits (e.g., 12 bits) within the DCI to maintain a defined resolution or granularity for the TA. For example, wireless communications system 200 may utilize 12 bits to define a TA with a granularity of 0.52, 0.26, 0.13, or 0.0625 microseconds for a sub-carrier spacing (SCS) of 15, 30, 60, or 120 kHz, respectively. In some cases, base station 105-*a* may determine to use all of the bits from a set of reserved bits within PDCCH 215 to transmit TA indication 220.

In some cases, the reserved bits may contain information such as a redundancy version identifier (RVID), a PUCCH resource indicator, or a PDSCH-to-HARQ feedback timing indicator, etc., where the information in the reserved bits may not be used for scheduling or receiving random access msgB 210. As such, when replacing the reserved bits with TA indication 220, base station 105-*a* may not send one or more sets of data corresponding to the reserved bits (e.g., HARQ or other feedback indicators), and UE 115-*a* may be unable to send feedback based on reception of PDCCH 215. In some cases, base station 105-*a* may indicate for UE 115-*a* to send feedback based on the status of random access msgB 210 within random access msgB 210. The UE 115-*a* may send the feedback using a subsequent PUCCH resource (e.g., HARQ ACK/NACK) or subsequent grant.

For example, base station 105-*a* may transmit, within random access msgB 210, an indication of a subsequent PUCCH resource for UE 115-*a* to use for reporting ACK/NACK feedback based on random access msgB 210. Base station 105-*a* may therefore determine that UE 115-*a* has successfully received random access msgB 210 if base station 105-*a* receives an ACK on the designated PUCCH resource. In some cases, if base station 105-*a* does not receive an ACK on the PUCCH resource, base station 105-*a* may retransmit random access msgB 210, and UE 115-*a* may combine multiple transmissions of random access msgB 210 for better reception (e.g., HARQ combining).

In another example, UE 115-*a* may receive an uplink grant in random access msgB 210 and may transmit subsequent uplink communications to base station 105-*a* using resources specified in the uplink grant. Accordingly, base station 105-*a* may determine that UE 115-*a* has successfully decoded random access msgB 210 if base station 105-*a* receives the uplink communications from UE 115-*a* (e.g., which may include an indication of successful reception of random access msgB 210). In some cases, if base station 105-*a* does not receive the uplink communications from UE 115-*a*, base station 105-*a* may determine that UE 115-*a* has not successfully received random access msgB 210 and may therefore determine to retransmit random access msgB 210.

Additionally or alternatively, UE 115-*a* may receive a downlink grant in random access msgB 210, which may also indicate subsequent HARQ feedback resources associated with the downlink grant. As such, base station 105-*a* may determine that UE 115-*a* has successfully received random access msgB 210 if base station 105-*a* receives feedback associated with communications on the downlink grant (e.g., which may include an indication of successful reception of random access msgB 210). In some cases, if base station 105-*a* does not receive the feedback associated with the downlink communications from UE 115-*a*, base station 105-*a* may determine that UE 115-*a* has not successfully received random access msgB 210 and may therefore determine to retransmit random access msgB 210. Additionally or alternatively, base station 105-*a* may obtain feedback related to random access msgB 210 by employing a combination of any one or more of the PUCCH resource, the uplink grant, or the downlink grant. In some examples, base station 105-*a* may experience a longer delay when determining the status of random access msgB 210 using a downlink or uplink grant, as compared to using the PUCCH resource, and may therefore be unable to successfully employ HARQ combining (e.g., due to the longer delay).

Accordingly, base station 105-*a* may determine to enhance HARQ combining for random access msgB 210 by requesting ACK/NACK feedback based on PDCCH 215. In some cases, UE 115-*a* may transmit ACK/NACK feedback for random access msgB 210, where the feedback may also be based on PDCCH 215 and the ACK/NACK transmission timing may be based on TA indication 220 included in PDCCH 215. If base station 105-*a* requests ACK/NACK feedback based on PDCCH 215, base station 105-*a* may determine to include fields within PDCCH 215 that are used for ACK/NACK feedback (PUCCH resource indicator, PDSCH-to-HARQ feedback timing indicator, etc.), which may limit the set of reserved bits available within PDCCH 215 for transmitting TA indication 220. In some examples, base station 105-*a* may determine to include the feedback fields within PDCCH 215 while still transmitting TA indication 220 on the defined set of bits (e.g., 12 bits). In some cases, base station 105-*a* may determine to include TA indication 220 on a smaller set of bits (e.g., 8 bits) within PDCCH 215. In order to ensure TA indication 220 fits within the smaller set of bits, base station 105-*a* may reduce the granularity of TA indication 220 or may indicate that the TA is relative to the last uplink timing instead of indicating an absolute TA. In some examples, base station 105-*a* may indicate a coarser granularity using RMSI and may refine the TA according to the defined granularity after completing the random access procedure (e.g., via a subsequent MAC CE).

Additionally or alternatively, if base station 105-*a* determines that the TA is beyond the range which can be indicated using the smaller set of bits within PDCCH 215 (e.g., 10 bits are needed but only 8 bits are available), base station 105-*a* may use the smaller set of bits to indicate to UE 115-*a* that TA indication 220 is included within random access msgB 210, not within PDCCH 215. Accordingly, UE 115-*a* may decode random access msgB 210 to receive the correct TA. As such, base station 105-*a* may further indicate whether UE 115-*a* may transmit NACK feedback without successfully decoding random access msgB 210 for the correct TA. For example, UE 115-*a* may not have obtained the correct TA for HARQ feedback transmissions (e.g., NACK feedback) if UE 115-*a* has not decoded random access msgB 210, and the correct TA may or may not be used (e.g., as determined by base station 105-*a*) for accurate HARQ feedback transmissions to base station 105-*a*.

Figure 3:
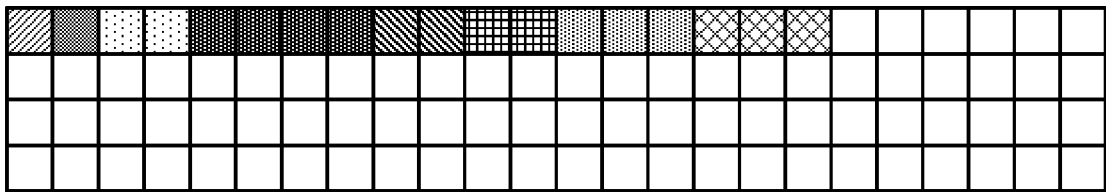
FIG. 3 illustrates an example of a physical downlink control (PDCCH) message that supports timing indication for a two-step RACH procedure in accordance with aspects of the present disclosure.
Figure 3:
Figure 3:
Figure 3:
Figure 3:
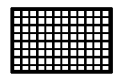
Figure 3:
Figure 3:
Figure 3:
Figure 3:
Figure 3:
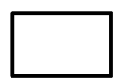

FIG. 3 illustrates an example of a PDCCH message 300 that supports timing indication for a two-step random access channel procedure in accordance with aspects of the present disclosure. In some examples, PDCCH message 300 may implement aspects of wireless communication systems 100 or 200. For example, a base station 105 may use a PDCCH message 300 to configure and transmit control information (e.g., a TA indication) to a UE 115. Similarly, the UE 115 may be configured with a layout or a bitmap corresponding to PDCCH message 300 to allow the UE 115 to correctly read the data contained in PDCCH message 300. Additionally, The UE 115 and the base station 105 may be examples of a UE 115 and a base station 105 as described with reference to FIGS. 1 and 2.

As described with reference to FIGS. 1 and 2, the base station 105 may determine to send a TA indication within a PDCCH message 300 directed to the UE 115, where PDCCH message 300 may correspond to a random access msgB and may in some cases precede random access msgB. In some cases, PDCCH message 300 may be an example of a PDCCH message including DCI, which may correspond to a specific bitmap or DCI format (e.g., DCI format 1_0). As such, PDCCH message 300 may contain both reserved bits (e.g., bits 305-340), which the base station 105 may replace with a TA indication, and unavailable bits 345, which may be unavailable for replacement. In some examples, information in reserved bits 305-340 may not be used for scheduling the random access msgB, which may therefore be replaced with the TA indication.

With reference to the following description of PDCCH message 300, bits may be located in a different order than the order shown, some bits may be left out of PDCCH message 300, or other bits may be added to PDCCH message 300. In some cases of PDCCH message 300, the reserved bits may include: one bit for a DCI format identifier 305, one bit for a new data indicator 310, two bits for an RVID 315, four bits for a HARQ process number 320, two bits for a downlink assignment index 325, two bits for a PUCCH transmission power control (TPC) command 330, three bits for a PUCCH resource indicator 335, and three bits for a HARQ timing indicator 340. In some cases, the rest of the bits on PDCCH message 300 may be unavailable bits 345.

As described with reference to FIG. 2, the base station 105 may determine to replace all of reserved bits 305-340 with the TA indication. In some cases, the TA indication may follow a defined granularity or resolution, which may determine a defined number of bits used to transmit the TA indication. For example, the base station 105 may determine to transmit the TA indication on 12 bits in order to maintain a resolution of 0.52 microseconds on an SCS of 15 kHz. In some cases, the base station 105 may determine to transmit the TA indication using the defined number of bits (e.g., 12 bits) and may replace all of reserved bits 305-340 (e.g., 18 bits) with the TA indication. Therefore, the base station 105 may maintain the defined granularity of the TA when transmitting the TA indication within PDCCH message 300. Following the transmission of PDCCH message 300, the base station 105 may transmit the corresponding random access msgB. The random access msgB may contain instructions to use one or more of a PUCCH resource, an uplink grant, or a downlink grant to provide feedback from the UE 115 to the base station 105 regarding the reception status of random access msgB.

Additionally or alternatively, as described with reference to FIG. 2, the base station 105 may determine to enhance HARQ combining for random access msgB by requesting ACK/NACK feedback based on PDCCH message 300. As such, the base station 105 may determine not to replace one or more fields which may be used for ACK/NACK feedback within the reserved bits 305-340. As such, PDCCH message 300 may contain a smaller number of reserved bits (e.g., 8 bits, 10 bits, 11 bits, 13 bits) that may be replaced with a TA indication. For example, the base station 105 may determine to include one or more of RVID 315, PUCCH TPC indicator 330, PUCCH resource indicator 335, and HARQ timing indicator 340 within PDCCH message 300. In some cases, the base station 105 may decide to include RVID 315 to improve HARQ combining with incremental redundancy.

In some examples, if each of the fields mentioned above were included in PDCCH message 300, the base station 105 may have 8 bits to transmit the TA indication. However, the base station 105 may determine that one or more of the above fields may not be used for HARQ feedback. For example, the base station 105 may determine to specify a fixed HARQ timing in RMSI transmissions and may therefore not include HARQ timing indicator 340 within PDCCH message 300 (e.g., leaving 11 bits for the TA indication). In some examples, the base station 105 may determine to not include RVID 315 within PDCCH message 300 (e.g., leaving 10 bits for the TA indication), and may additionally determine to not include HARQ timing indicator 340 (e.g., leaving enough bits to include the TA indication).

In some examples, the base station 105 may determine that there are enough available reserved bits (e.g., 13 bits) within PDCCH 300 to transmit the TA indication using the defined number of bits (e.g., 12 bits). In other examples, the base station 105 may determine the number of bits available within PDCCH 300 is smaller than the defined number of bits (e.g., 8 bits, 10 bits, 11 bits). As such, the base station 105 may determine to modify the TA indication to fit within the available number of bits by reducing the granularity of the TA indication or by indicating a TA relative to the last uplink timing (e.g., instead of an absolute TA). If the base station 105 reduces the TA granularity, the base station 105 may indicate the reduced granularity to the UE 115 using RMSI signaling, and the base station 105 may refine the TA in subsequent communications (e.g., using a MAC CE) according to the defined granularity.

In some cases, base station 105-*b* may determine that the TA indication size is beyond a range which may be indicated by the available reserved bits within PDCCH message 300. Accordingly, the base station 105 may indicate (e.g., via a codepoint in the TA indication portion of PDCCH message 300) that the TA is to be included in the random access msgB and not within PDCCH message 300. As such, the base station 105 may further indicate whether the UE 115 may transmit NACK feedback for the random access msgB without decoding the random access msgB for the correct TA indication (e.g., since the TA may be needed to correctly transmit NACK feedback).

Figure 4:
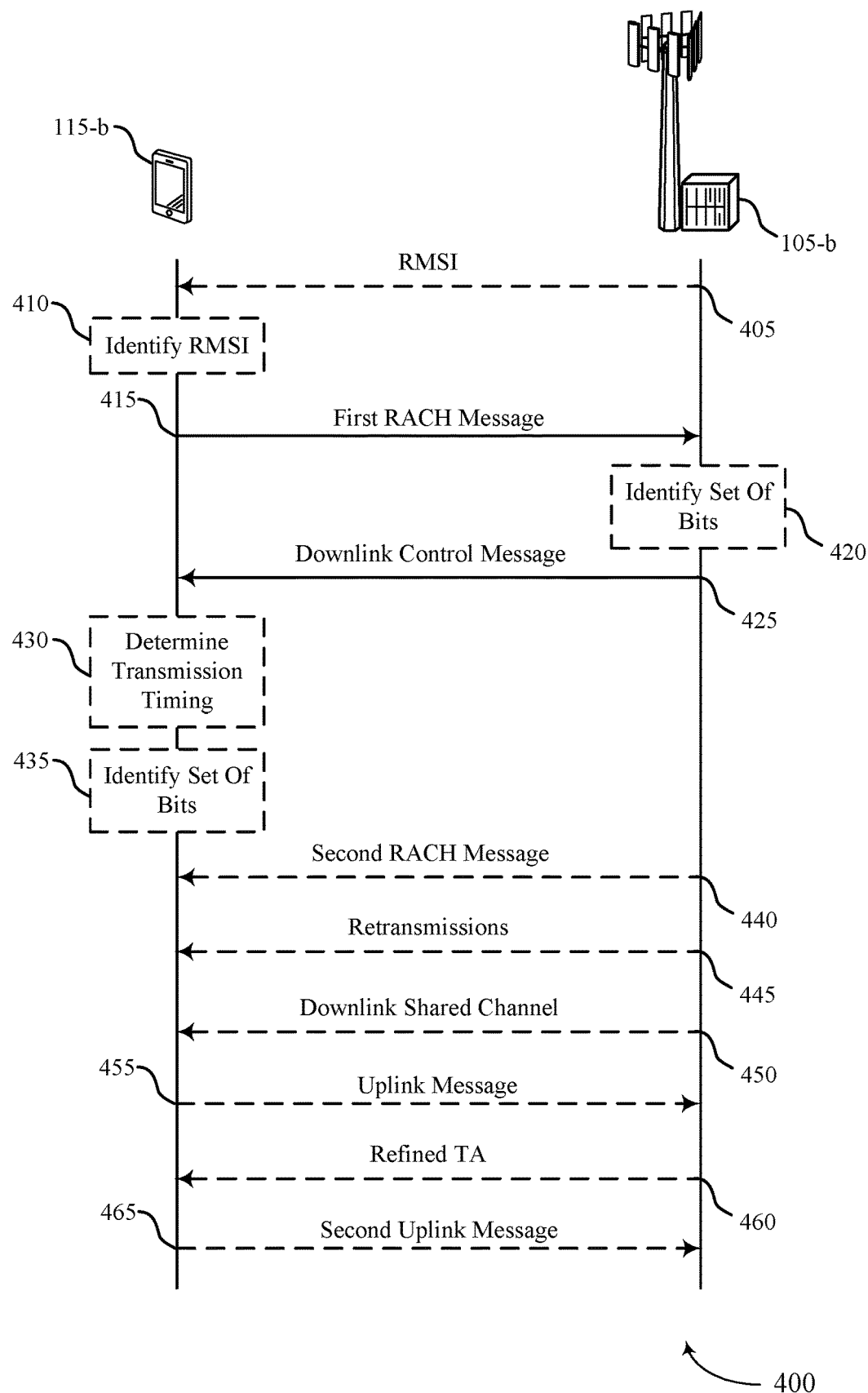
FIG. 4 illustrates an example of a process flow that supports timing indication for a two-step RACH procedure in accordance with aspects of the present disclosure.

FIG. 4 illustrates an example of a process flow 400 that supports timing indication for a two-step random access channel procedure in accordance with aspects of the present disclosure. In some examples, process flow 400 may implement aspects of wireless communications systems 100 or 200. Additionally, process flow 400 may implement aspects of PDCCH message 300. Further, process flow 400 may be implemented by a UE 115-*b* and a base station 105-*b*, which may be examples of a UE 115 and a base station 105 described with reference to FIGS. 1-3.

In the following description of the process flow 400, the operations between UE 115-*b* and base station 105-*b* may be transmitted in a different order than the order shown, or the operations performed by base station 105-*b* and UE 115-*b* may be performed in different orders or at different times. Some operations may be omitted from the process flow 400, or other operations may be added to the process flow 400. While base station 105-*b* and UE 115-*b* are shown performing a number of the operations of process flow 400, any wireless device may perform the operations shown.

At 405, base station 105-*b* may transmit RMSI to UE 115-*b*, the RMSI indicating a fixed timing for an uplink message, a granularity for an indication of a TA in a downlink control message, or both.

At 410, UE 115-*b* may identify RMSI for UE 115-*b*, where an uplink message may be transmitted according to a fixed timing indicated by the RMSI for UE 115-*b*. In some cases, the RMSI may indicate a granularity for an indication of a TA in a downlink control message (e.g., PDCCH message).

At 415, UE 115-*b* may transmit a first message of a two-step RACH procedure to base station 105-*b*, where the two-step RACH procedure may include the first message and a second message.

At 420, base station 105-*b* may identify a set of bits of a downlink control message (e.g., PDCCH message) reserved for information other than an indication of a TA based on a format of the downlink control message. In some cases, the set of bits may correspond to one or more of a DCI format identifier, a new data indicator, a redundancy version, a HARQ process number, a downlink assignment index, a TPC command, uplink control resource information, a feedback timing indicator, or any combination thereof.

At 425, base station 105-*b* may transmit a downlink control message (e.g., PDCCH message) to UE 115-*b*, where the downlink control message may include scheduling information for the second message and an indication of a TA for uplink transmissions from UE 115-*b*. When transmitting the downlink control message, base station 105-*b* may include bits indicating the TA in at least a portion of the set of bits of the downlink control message reserved for information other than the indication of the TA, where in some examples, base station 105-*b* may include bits indicating the TA in all bits of the set of bits. Additionally or alternatively, the indication of the TA for uplink transmissions from UE 115-*b* included in the downlink control message may indicate that the TA is to be included in a second message.

In some cases, base station 105-*b* may transmit, and UE 115-*b* may receive, the downlink control message based at least in part on a C-RNTI associated with UE 115-*b*. Further, the downlink control message may indicate transmission information for the uplink message, the transmission information including one or more of a TPC command, uplink control resource information, a feedback timing indicator, a redundancy version, or any combination thereof. In some examples, the indication of the TA for uplink transmissions from UE 115-*b* included in the downlink control message may indicate a relative TA with respect to a previous TA for UE 115-*b*.

At 430, UE 115-*b* may determine a transmission timing for an uplink message based on the indication of the TA.

At 435, UE 115-*b* may identify a set of bits of the downlink control message reserved for information other than the indication of the TA, based on a format of the downlink control message, where at least a portion of the set of bits may include bits indicating the TA. In some cases, the set of bits may correspond to one or more of a DCI format identifier, a new data indicator, a redundancy version, a HARQ process number, a downlink assignment index, a TPC command, uplink control resource information, a feedback timing indicator, or any combination thereof. In some examples, all bits of the set of bits may be used for indicating the TA.

At 440, base station 105-*b* may transmit the second message to UE 115-*b* based on the scheduling information. In some cases, UE 115-*b* may identify a set of resources for transmission of the second message based on the scheduling information received in the downlink control message. In some cases, UE 115-*b* may monitor the set of resources for the second message from base station 105-*b* based on the scheduling information, where the second message may include at least one of a PUCCH resource information, an uplink grant, a downlink grant, or any combination thereof. Further, base station 105-*b* may transmit the second message via a broadcast transmission or a unicast transmission to UE 115-*b*, based on the scheduling information, where the second message may be addressed to a C-RNTI associated with UE 115-*b*. In some examples, UE 115-*b* may determine a decoding failure of the second message based on monitoring the set of resources and the scheduling information and may refrain from performing an additional RACH procedure based on the decoding failure and the scheduling information. In some examples, the second message may include the indication of the TA.

At 445, base station may transmit one or more retransmissions of the second message to UE 115-*b*, and UE 115-*b* may determine feedback information for the second message based on the second message and the one or more retransmissions of the second message.

At 450, base station 105-*b* may transmit a downlink shared channel to UE 115-*b* based on the downlink grant.

At 455, UE 115-*b* may transmit an uplink message to base station 105-*b*, where the uplink message may be transmitted according to the transmission timing, and where base station 105-*b* may monitor for the uplink message from UE 115-*b* based on the TA. In some cases, base station 105-*b* may receive the uplink message from UE 115-*b* based on the monitoring, where the uplink message may be received according to the TA. Additionally, base station 105-*b* may monitor for feedback information for the second message (e.g., within the uplink message) based on the second message and the one or more retransmissions of the second message. In some examples, the uplink message may indicate that the two-step RACH procedure is complete. In some cases, the uplink message transmitted by UE 115-*b* may include feedback information for the second message. For example, UE 115-*b* may transmit, to base station 105-*b*, an indication of feedback for the second message based on the monitoring, where the indication of feedback may be transmitted in a PUCCH via resources indicated by the PUCCH resource information.

Additionally or alternatively, UE 115-*b* may transmit, to base station 105-*b*, an indication of feedback for the second message based on the monitoring, where the indication of feedback may be transmitted in a PUSCH via resources indicated by the uplink grant. In some examples, transmitting the uplink message to base station 105-*b* may include monitoring for a downlink shared channel from base station 105-*b* based at least in part on the downlink grant. Transmitting the uplink message to base station 105-*b* may also include transmitting an indication of feedback for the downlink shared channel and the second message to base station 105-*b*, where the indication of feedback may be transmitted in response to the downlink shared channel.

At 460, base station 105-*b* may transmit a refined TA to UE 115-*b* via a MAC CE.

At 465, UE 115-*b* may transmit a second uplink message to base station 105-*b* in accordance with the refined TA. In some examples, the indication of the TA for uplink transmissions from UE 115-*b* included in the downlink control message may indicate that the TA is to be included in the second uplink message.

Figure 5:
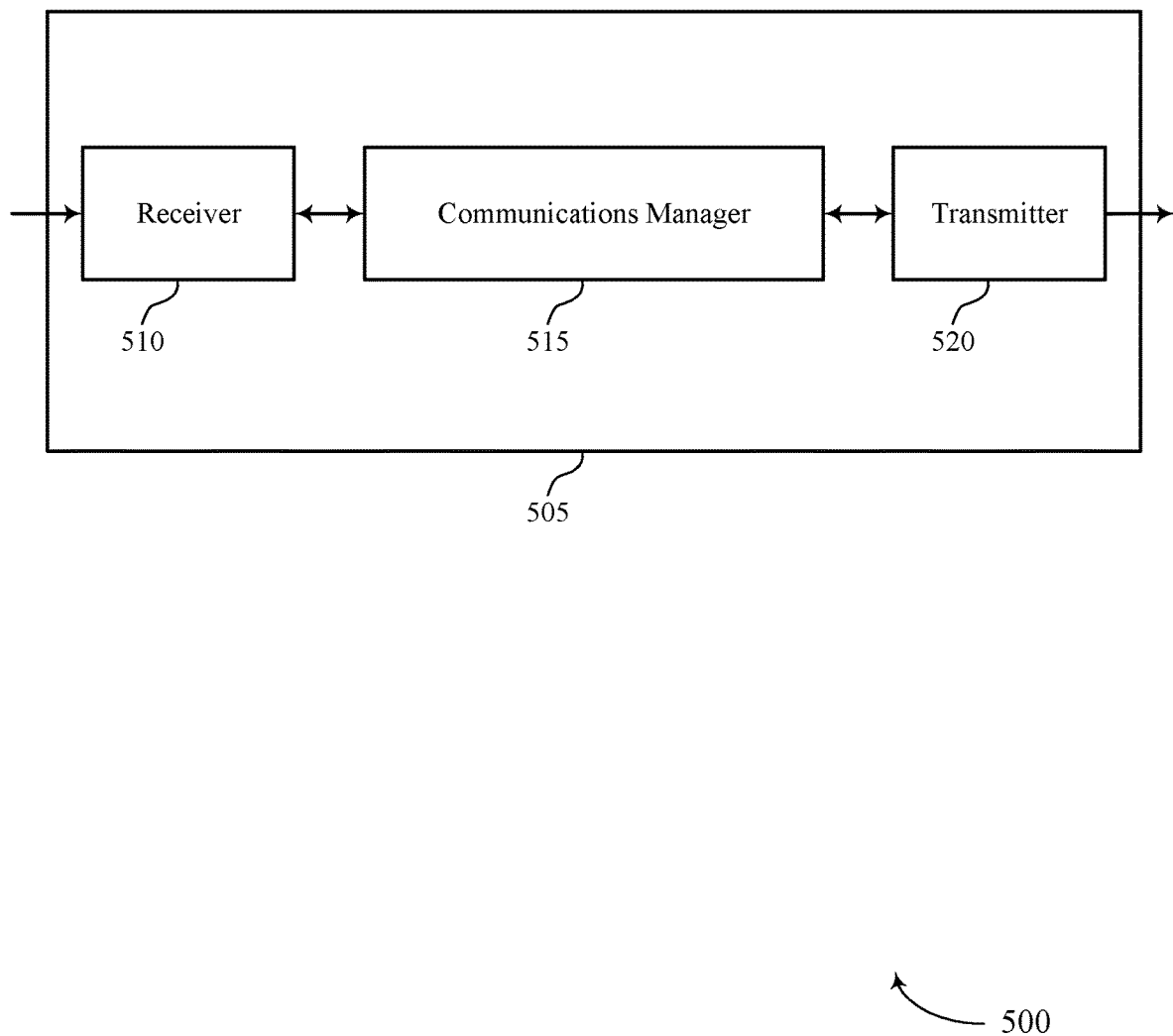
FIGS. 5 and 6 show block diagrams of devices that support timing indication for a two-step RACH procedure in accordance with aspects of the present disclosure.

FIG. 5 shows a block diagram 500 of a device 505 that supports timing indication for a two-step RACH procedure in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to timing indication for a two-step RACH procedure, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a first message of a two-step RACH procedure, the two-step RACH procedure including the first message and a second message and receive a downlink control message from the base station, the downlink control message including scheduling information for the second message and an indication of a timing advance for uplink transmissions from the UE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. One implementation may enable a base station to include a TA indication for a two-step RACH procedure within the PDCCH corresponding to a msgB. Such feedback may improve delays associated with including the TA indication within the payload for msgB, which may result in higher data rates and more efficient communications (e.g., fewer msgB retransmissions), among other advantages.

Based on implementing the reporting as described herein, a processor of a base station (e.g., a processor controlling the receiver 510, the communications manager 515, the transmitter 520, or a combination thereof) may reduce the likelihood of retransmission of msgB in a two-step RACH procedure while ensuring relatively efficient communications. For example, the TA indication techniques described herein may leverage using reserved bits to include the TA indication within the PDCCH, which may realize reduced signaling overhead and power savings, among other benefits.

Figure 6:
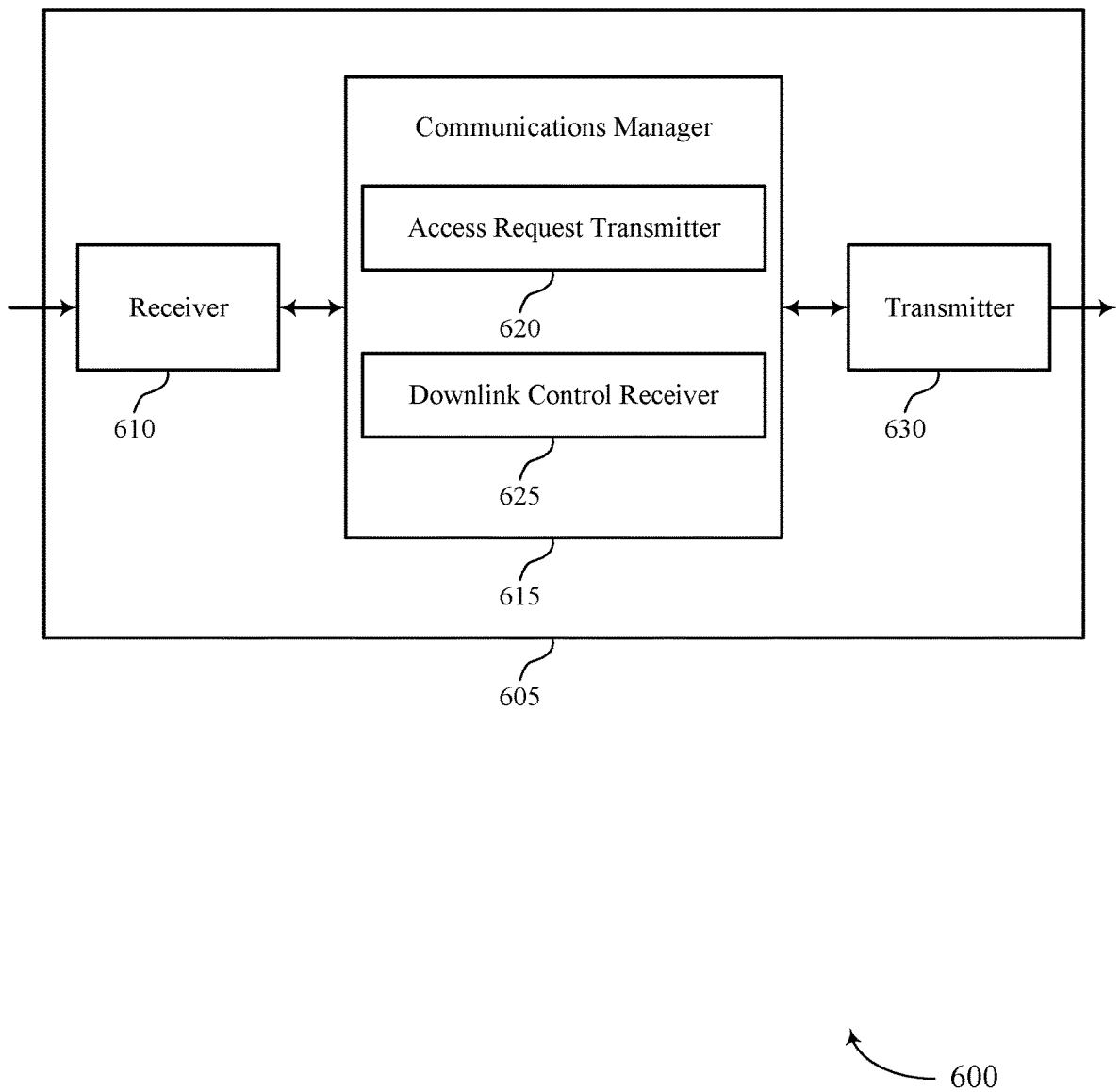

FIG. 6 shows a block diagram 600 of a device 605 that supports timing indication for a two-step RACH procedure in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to timing indication for a two-step RACH procedure, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an access request transmitter 620 and a downlink control receiver 625. The communications manager 615 may be an example of aspects of the communications manager 810 described herein.

The access request transmitter 620 may transmit, to a base station, a first message of a two-step RACH procedure, the two-step RACH procedure including the first message and a second message.

The downlink control receiver 625 may receive a downlink control message from the base station, the downlink control message including scheduling information for the second message and an indication of a timing advance for uplink transmissions from the UE.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
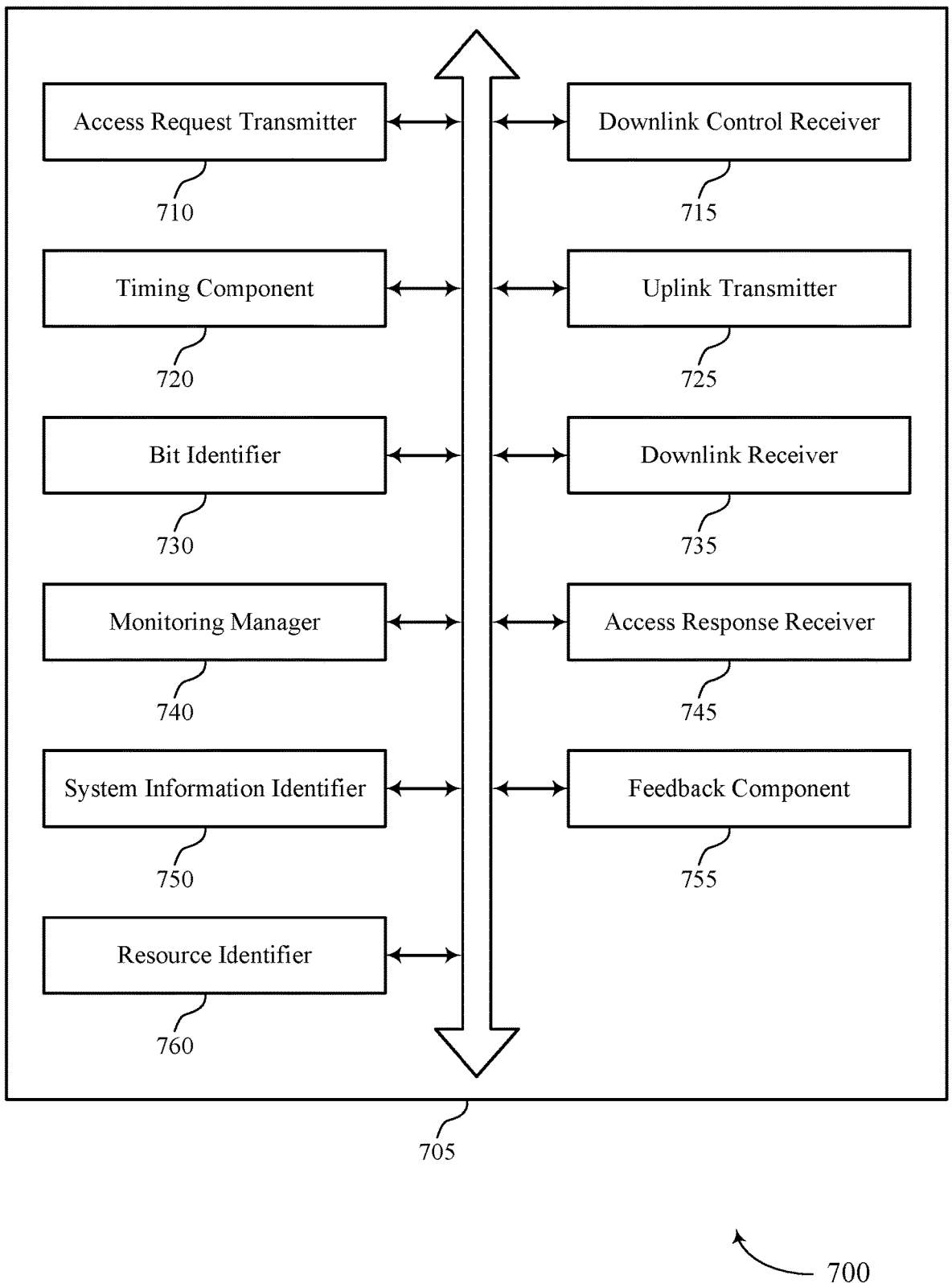
FIG. 7 shows a block diagram of a communications manager that supports timing indication for a two-step RACH procedure in accordance with aspects of the present disclosure.

FIG. 7 shows a block diagram 700 of a communications manager 705 that supports timing indication for a two-step RACH procedure in accordance with aspects of the present disclosure. The communications manager 705 may be an example of aspects of a communications manager 515, a communications manager 615, or a communications manager 810 described herein. The communications manager 705 may include an access request transmitter 710, a downlink control receiver 715, a timing component 720, an uplink transmitter 725, a bit identifier 730, a downlink receiver 735, a monitoring manager 740, an access response receiver 745, a system information identifier 750, a feedback component 755, and a resource identifier 760. Each of these modules may communicate, directly or indirectly, with one another (e.g., via one or more buses).

The access request transmitter 710 may transmit, to a base station, a first message of a two-step RACH procedure, the two-step RACH procedure including the first message and a second message.

In some examples, the access request transmitter 710 may refrain from performing an additional RACH procedure based on the decoding failure and the scheduling information.

The downlink control receiver 715 may receive a downlink control message from the base station, the downlink control message including scheduling information for the second message and an indication of a timing advance for uplink transmissions from the UE.

In some examples, the downlink control receiver 715 may receive the downlink control message based on a C-RNTI associated with the UE.

In some examples, monitoring for the second message from the base station based on the scheduling information, where the second message includes at least one of a PUCCH resource information, an uplink grant, a downlink grant, or any combination thereof.

In some cases, the downlink control message indicates transmission information for the uplink message, the transmission information including one or more of a transmission power control command, uplink control resource information, a feedback timing indicator, a redundancy version, or any combination thereof.

In some cases, the indication of the timing advance for uplink transmissions from the UE included in the downlink control message indicates that the timing advance is to be included in the second message.

In some cases, the indication of the timing advance for uplink transmissions from the UE included in the downlink control message indicates a relative timing advance with respect to a previous timing advance for the UE.

The timing component 720 may determine a transmission timing for an uplink message based on the indication of the timing advance.

The uplink transmitter 725 may transmit the uplink message to the base station, the uplink message transmitted according to the transmission timing.

In some examples, the uplink transmitter 725 may transmit, to the base station, an indication of feedback for the second message based on the monitoring, where the indication of feedback is transmitted in a PUCCH via resources indicated by the PUCCH resource information.

In some examples, the uplink transmitter 725 may transmit, to the base station, an indication of feedback for the second message based on the monitoring, where the indication of feedback is transmitted in a PUSCH via resources indicated by the uplink grant.

In some examples, the uplink transmitter 725 may transmit, to the base station, an indication of feedback for the downlink shared channel and the second message, where the indication of feedback is transmitted in response to the downlink shared channel.

In some examples, the uplink transmitter 725 may transmit an uplink message transmitted to the base station, the uplink message including feedback information for the second message.

In some examples, the uplink transmitter 725 may transmit a second uplink message to the base station in accordance with the refined timing advance.

In some cases, the uplink message indicates that the two-step RACH procedure is complete.

The bit identifier 730 may identify a set of bits of the downlink control message reserved for information other than the indication of the timing advance based on a format of the downlink control message, where at least a portion of the set of bits includes bits indicating the timing advance.

In some examples, the bit identifier 730 may identify that all bits of the set of bits are used for indicating the timing advance.

In some cases, the set of bits corresponds to one or more of a DCI format identifier, a new data indicator, a redundancy version, a HARQ process number, a downlink assignment index, a transmission power control command, uplink control resource information, a feedback timing indicator, or any combination thereof.

The downlink receiver 735 may monitor for a downlink shared channel from the base station based on the downlink grant.

In some examples, the downlink receiver 735 may receive a refined timing advance from the base station via a MAC CE.

The monitoring manager 740 may monitor for the second message from the base station based on the scheduling information.

In some examples, the monitoring manager 740 may monitor the set of resources for the second message from the base station based on the scheduling information.

The access response receiver 745 may identify RMSI for the UE, where the uplink message is transmitted according to a fixed timing indicated by the RMSI for the UE.

In some examples, the access response receiver 745 may receive the second message via a broadcast transmission or a unicast transmission from the base station based on the scheduling information, where the second message is addressed to a C-RNTI associated with the UE.

In some examples, the access response receiver 745 may receive one or more retransmissions of the second message from the base station.

The system information identifier 750 may identify RMSI for the UE, where the RMSI indicates a granularity for the indication of the timing advance in the downlink control message.

The feedback component 755 may determine feedback information for the second message based on the second message and the one or more retransmissions of the second message.

In some examples, the feedback component 755 may determine a decoding failure of the second message based on monitoring the set of resources and the scheduling information.

The resource identifier 760 may identify a set of resources for transmission of the second message based on the scheduling information received in the downlink control message.

Figure 8:
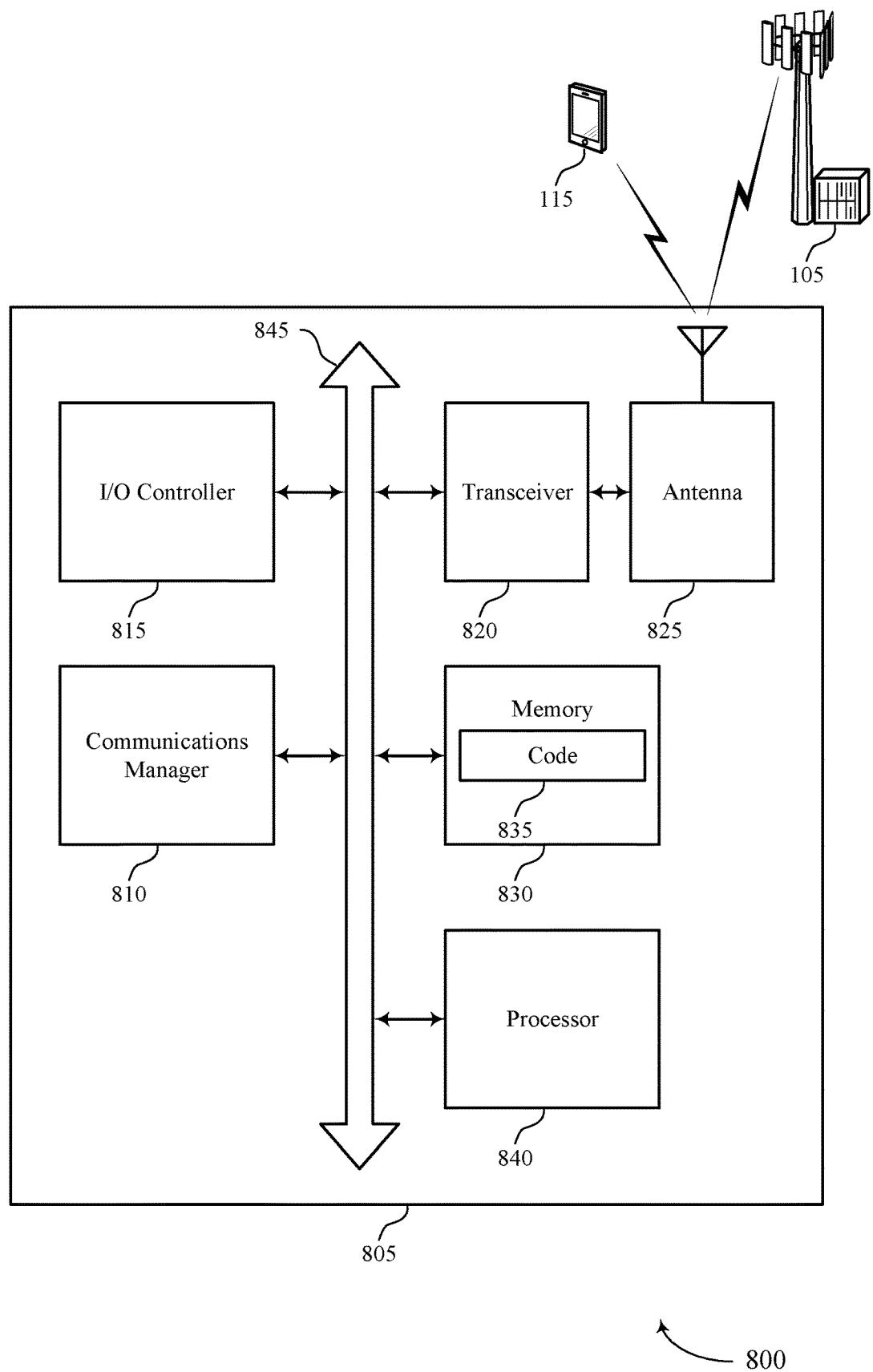
FIG. 8 shows a diagram of a system including a device that supports timing indication for a two-step RACH procedure in accordance with aspects of the present disclosure.

FIG. 8 shows a diagram of a system 800 including a device 805 that supports timing indication for a two-step RACH procedure in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, a first message of a two-step RACH procedure, the two-step RACH procedure including the first message and a second message and receive a downlink control message from the base station, the downlink control message including scheduling information for the second message and an indication of a timing advance for uplink transmissions from the UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting timing indication for a two-step RACH procedure).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
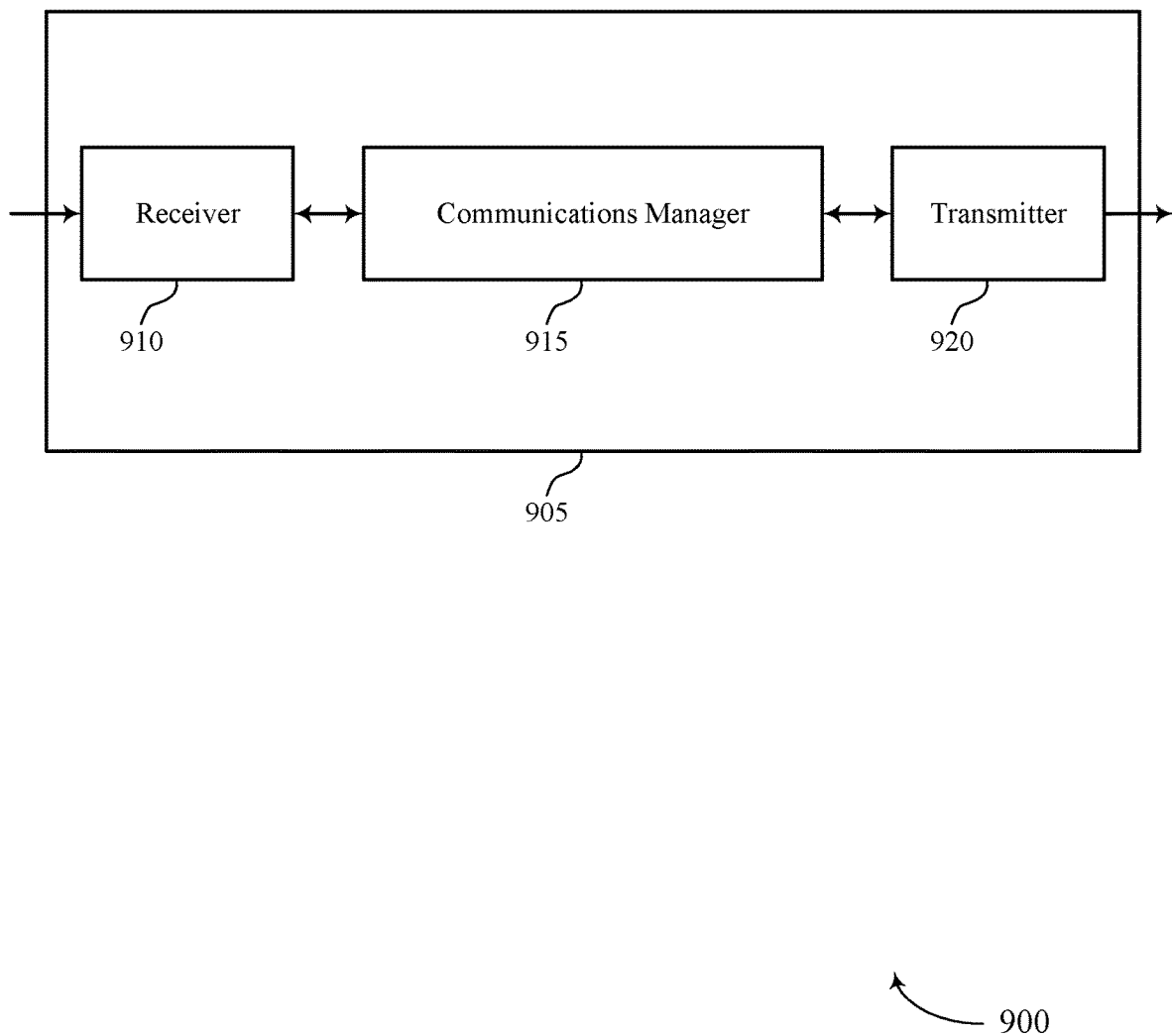
FIGS. 9 and 10 show block diagrams of devices that support timing indication for a two-step RACH procedure in accordance with aspects of the present disclosure.

FIG. 9 shows a block diagram 900 of a device 905 that supports timing indication for a two-step RACH procedure in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to timing indication for a two-step RACH procedure, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a first message of a two-step RACH procedure, the two-step RACH procedure including the first message and a second message, transmit a downlink control message to the UE, the downlink control message including scheduling information for the second message and an indication of a timing advance for uplink transmissions from the UE, and monitor for an uplink message from the UE based on the timing advance. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
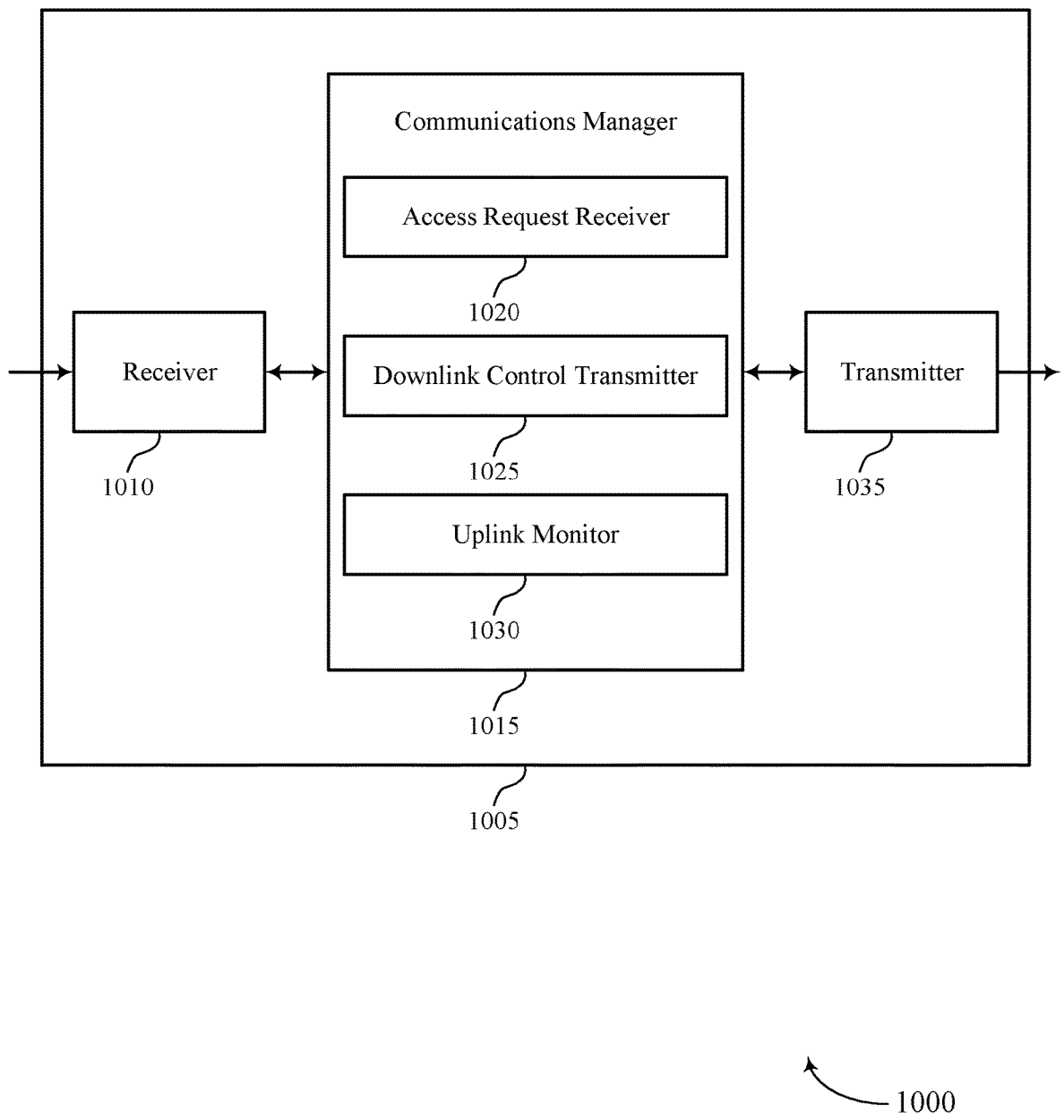

FIG. 10 shows a block diagram 1000 of a device 1005 that supports timing indication for a two-step RACH procedure in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to timing indication for a two-step RACH procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an access request receiver 1020, a downlink control transmitter 1025, and an uplink monitor 1030. The communications manager 1015 may be an example of aspects of the communications manager 1210 described herein.

The access request receiver 1020 may receive, from a UE, a first message of a two-step RACH procedure, the two-step RACH procedure including the first message and a second message.

The downlink control transmitter 1025 may transmit a downlink control message to the UE, the downlink control message including scheduling information for the second message and an indication of a timing advance for uplink transmissions from the UE.

The uplink monitor 1030 may monitor for an uplink message from the UE based on the timing advance.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
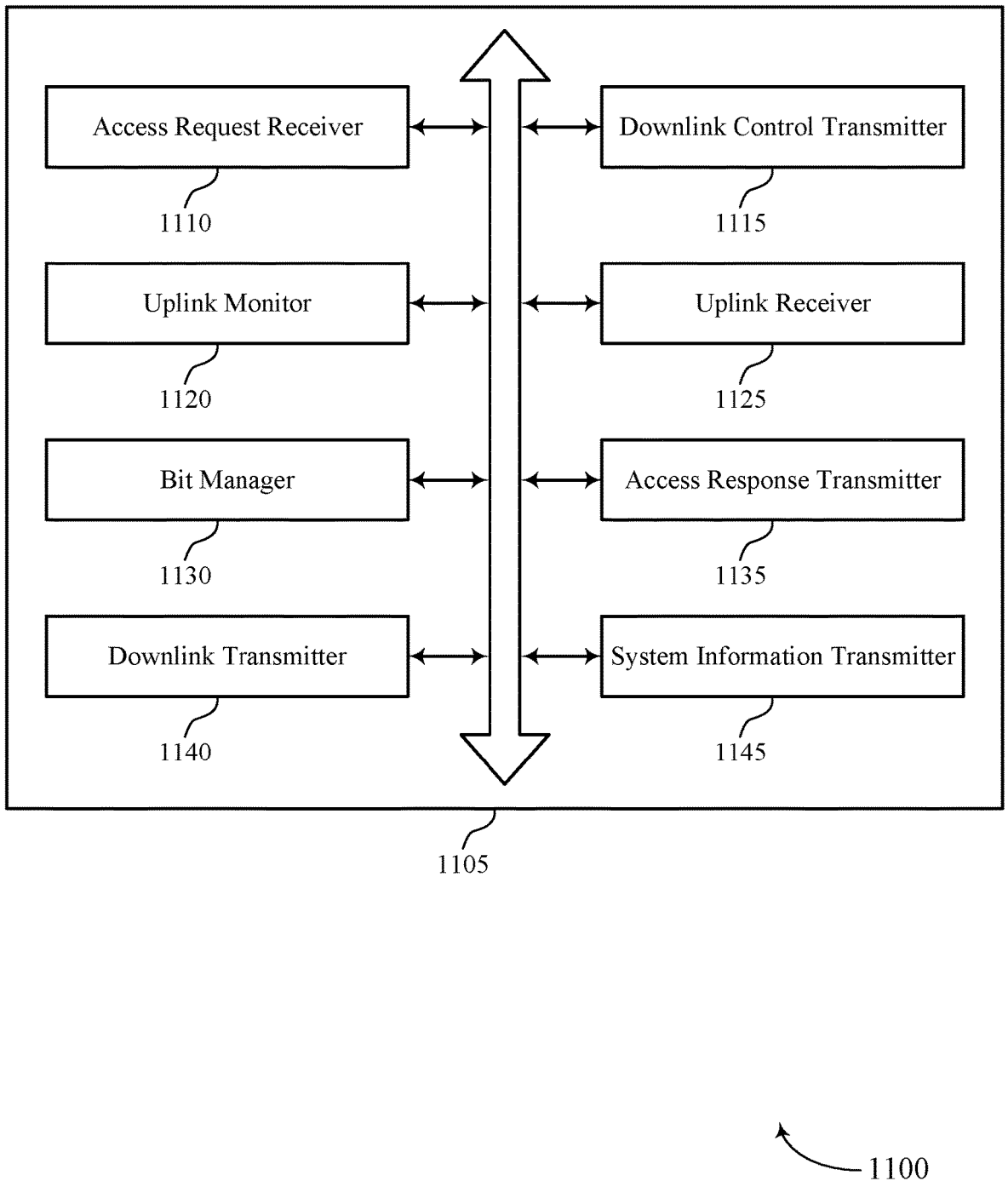
FIG. 11 shows a block diagram of a communications manager that supports timing indication for a two-step RACH procedure in accordance with aspects of the present disclosure.

FIG. 11 shows a block diagram 1100 of a communications manager 1105 that supports timing indication for a two-step RACH procedure in accordance with aspects of the present disclosure. The communications manager 1105 may be an example of aspects of a communications manager 915, a communications manager 1015, or a communications manager 1210 described herein. The communications manager 1105 may include an access request receiver 1110, a downlink control transmitter 1115, an uplink monitor 1120, an uplink receiver 1125, a bit manager 1130, an access response transmitter 1135, a downlink transmitter 1140, and a system information transmitter 1145. Each of these modules may communicate, directly or indirectly, with one another (e.g., via one or more buses).

The access request receiver 1110 may receive, from a UE, a first message of a two-step RACH procedure, the two-step RACH procedure including the first message and a second message.

The downlink control transmitter 1115 may transmit a downlink control message to the UE, the downlink control message including scheduling information for the second message and an indication of a timing advance for uplink transmissions from the UE.

In some examples, the downlink control transmitter 1115 may transmit the downlink control message based on a C-RNTI associated with the UE.

In some cases, the downlink control message indicates transmission information for the uplink message, the transmission information including one or more of a transmission power control command, uplink control resource information, a feedback timing indicator, a redundancy version, or any combination thereof.

In some cases, the indication of the timing advance for uplink transmissions from the UE included in the downlink control message indicates that the timing advance is to be included in the second message.

In some cases, the indication of the timing advance for uplink transmissions from the UE included in the downlink control message indicates a relative timing advance with respect to a previous timing advance for the UE.

The uplink monitor 1120 may monitor for an uplink message from the UE based on the timing advance.

In some examples, the uplink monitor 1120 may monitor for feedback information for the second message based on the second message and the one or more retransmissions of the second message.

The uplink receiver 1125 may receive the uplink message from the UE based on the monitoring, the uplink message received according to the timing advance and indicates that the two-step RACH procedure is complete.

In some examples, the uplink receiver 1125 may receive, from the UE, an indication of feedback for the second message in a PUCCH via resources indicated by the PUCCH resource information.

In some examples, the uplink receiver 1125 may receive, from the UE, an indication of feedback for the second message in a PUSCH via resources indicated by the uplink grant.

In some examples, the uplink receiver 1125 may receive, from the UE, an indication of feedback for the downlink shared channel and the second message, where the indication of feedback is received in response to the downlink shared channel.

In some examples, the uplink receiver 1125 may receive a second uplink message from the UE in accordance with the refined timing advance.

The bit manager 1130 may identify a set of bits of the downlink control message reserved for information other than the indication of the timing advance based on a format of the downlink control message.

In some examples, the bit manager 1130 may include bits indicating the timing advance in at least a portion of the set of bits of the downlink control message reserved for information other than the indication of the timing advance.

In some examples, the bit manager 1130 may include bits indicating the timing advance as all bits of the set of bits.

In some cases, the set of bits corresponds to one or more of a DCI format identifier, a new data indicator, a redundancy version, a HARQ process number, a downlink assignment index, a transmission power control command, uplink control resource information, a feedback timing indicator, or any combination thereof.

The access response transmitter 1135 may transmit the second message to the UE based on the scheduling information, where the second message includes at least one of a PUCCH resource information, an uplink grant, a downlink grant, or any combination thereof.

In some examples, transmitting the second message to the UE based on the scheduling information, where the uplink message received from the UE includes feedback information for the second message.

In some examples, the access response transmitter 1135 may transmit the second message to the UE, the second message including the indication of the timing advance.

In some examples, the access response transmitter 1135 may transmit the second message via a broadcast transmission or a unicast transmission from the base station based on the scheduling information, where the second message is addressed to a C-RNTI associated with the UE.

In some examples, the access response transmitter 1135 may transmit one or more retransmissions of the second message to the UE.

The downlink transmitter 1140 may transmit a downlink shared channel to the UE based on the downlink grant.

In some examples, the downlink transmitter 1140 may transmit a refined timing advance to the UE via a MAC CE.

The system information transmitter 1145 may transmit, to the UE, RMSI for the UE, the RMSI indicated a fixed timing for the uplink message.

In some examples, the system information transmitter 1145 may transmit, to the UE, RMSI for the UE, where the RMSI indicates a granularity for the indication of the timing advance in the downlink control message.

Figure 12:
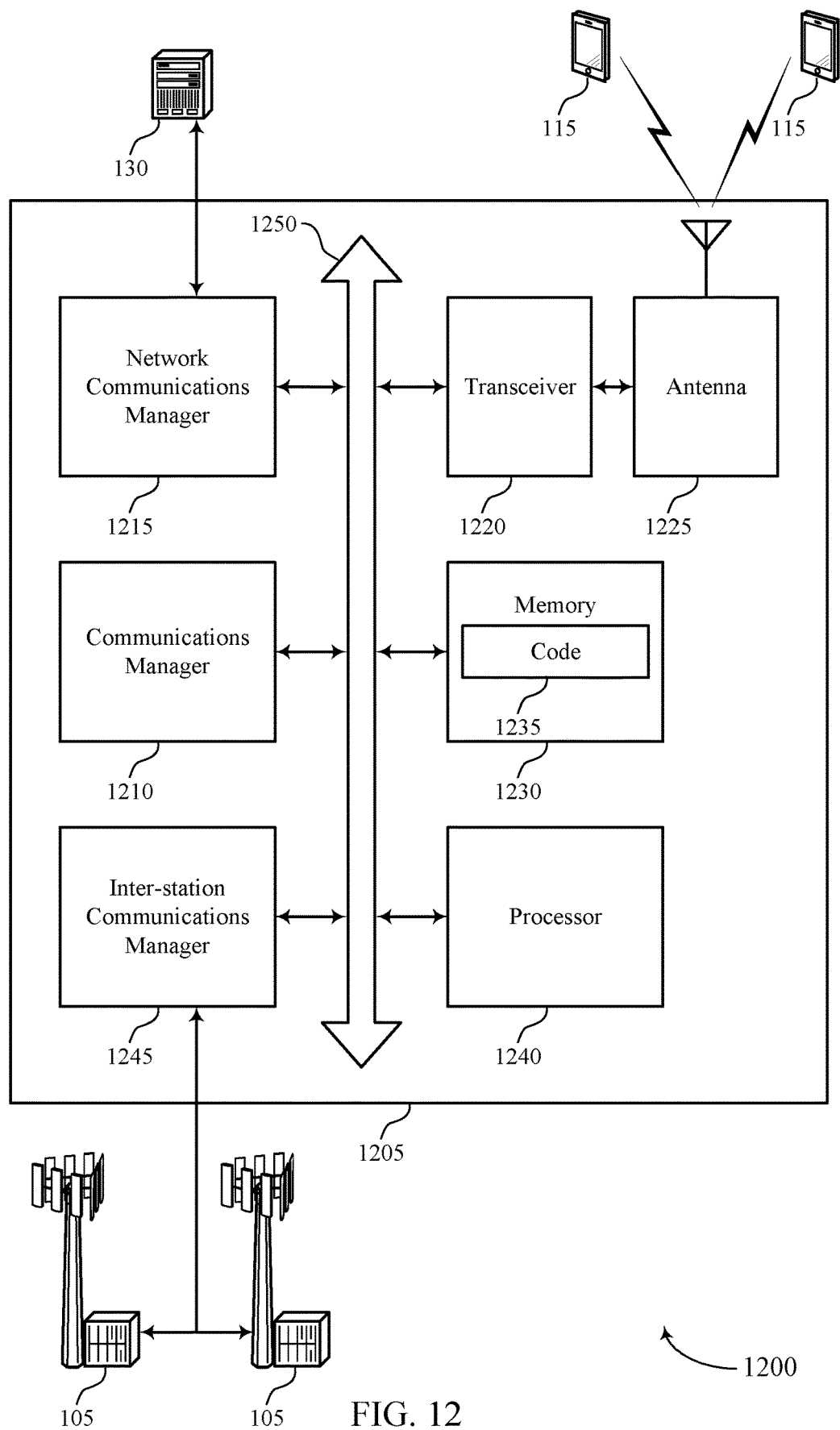
FIG. 12 shows a diagram of a system including a device that supports timing indication for a two-step RACH procedure in accordance with aspects of the present disclosure.

FIG. 12 shows a diagram of a system 1200 including a device 1205 that supports timing indication for a two-step RACH procedure in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a first message of a two-step RACH procedure, the two-step RACH procedure including the first message and a second message, transmit a downlink control message to the UE, the downlink control message including scheduling information for the second message and an indication of a timing advance for uplink transmissions from the UE, and monitor for an uplink message from the UE based on the timing advance.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting timing indication for a two-step RACH procedure).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
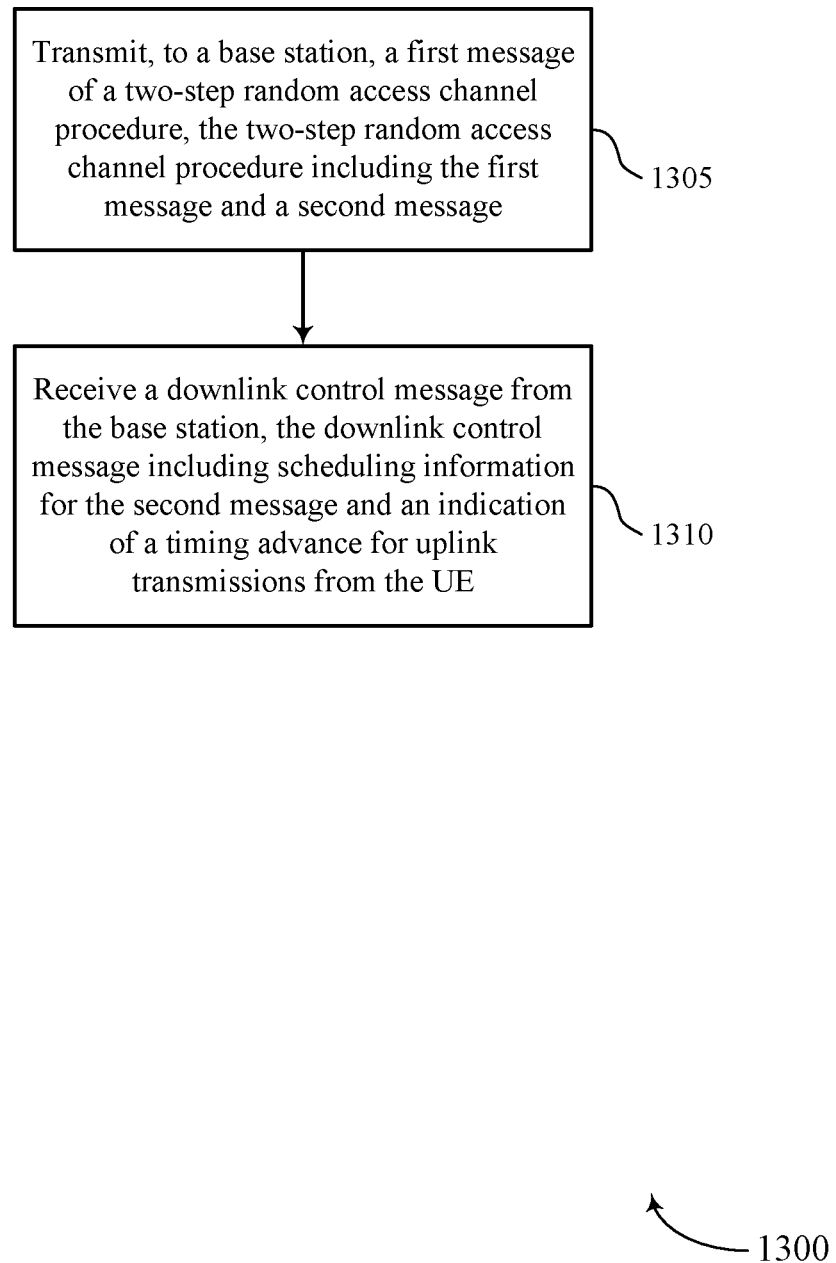
FIGS. 13 through 16 show flowcharts illustrating methods that support timing indication for a two-step RACH procedure in accordance with aspects of the present disclosure.

FIG. 13 shows a flowchart illustrating a method 1300 that supports timing indication for a two-step RACH procedure in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a base station, a first message of a two-step RACH procedure, the two-step RACH procedure including the first message and a second message. The operations of 1305 may be performed according to the methods described herein. In some examples, aspects of the operations of 1305 may be performed by an access request transmitter as described with reference to FIGS. 5 through 8.

At 1310, the UE may receive a downlink control message from the base station, the downlink control message including scheduling information for the second message and an indication of a timing advance for uplink transmissions from the UE. The operations of 1310 may be performed according to the methods described herein. In some examples, aspects of the operations of 1310 may be performed by a downlink control receiver as described with reference to FIGS. 5 through 8.

Figure 14:
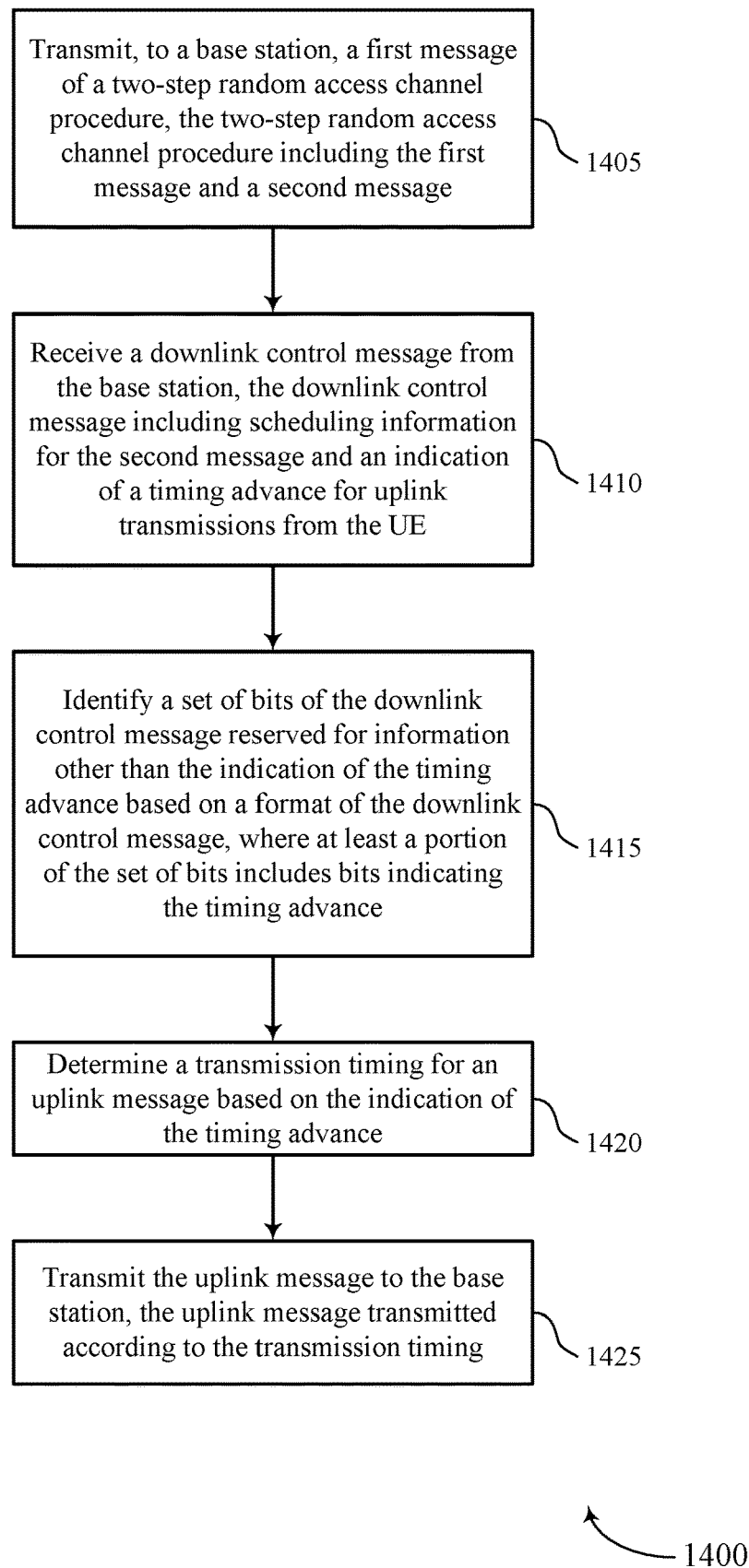

FIG. 14 shows a flowchart illustrating a method 1400 that supports timing indication for a two-step RACH procedure in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may transmit, to a base station, a first message of a two-step RACH procedure, the two-step RACH procedure including the first message and a second message. The operations of 1405 may be performed according to the methods described herein. In some examples, aspects of the operations of 1405 may be performed by an access request transmitter as described with reference to FIGS. 5 through 8.

At 1410, the UE may receive a downlink control message from the base station, the downlink control message including scheduling information for the second message and an indication of a timing advance for uplink transmissions from the UE. The operations of 1410 may be performed according to the methods described herein. In some examples, aspects of the operations of 1410 may be performed by a downlink control receiver as described with reference to FIGS. 5 through 8.

At 1415, the UE may identify a set of bits of the downlink control message reserved for information other than the indication of the timing advance based on a format of the downlink control message, where at least a portion of the set of bits includes bits indicating the timing advance. The operations of 1415 may be performed according to the methods described herein. In some examples, aspects of the operations of 1415 may be performed by a bit identifier as described with reference to FIGS. 5 through 8.

At 1420, the UE may determine a transmission timing for an uplink message based on the indication of the timing advance. The operations of 1420 may be performed according to the methods described herein. In some examples, aspects of the operations of 1420 may be performed by a timing component as described with reference to FIGS. 5 through 8.

At 1425, the UE may transmit the uplink message to the base station, the uplink message transmitted according to the transmission timing. The operations of 1425 may be performed according to the methods described herein. In some examples, aspects of the operations of 1425 may be performed by an uplink transmitter as described with reference to FIGS. 5 through 8.

Figure 15:
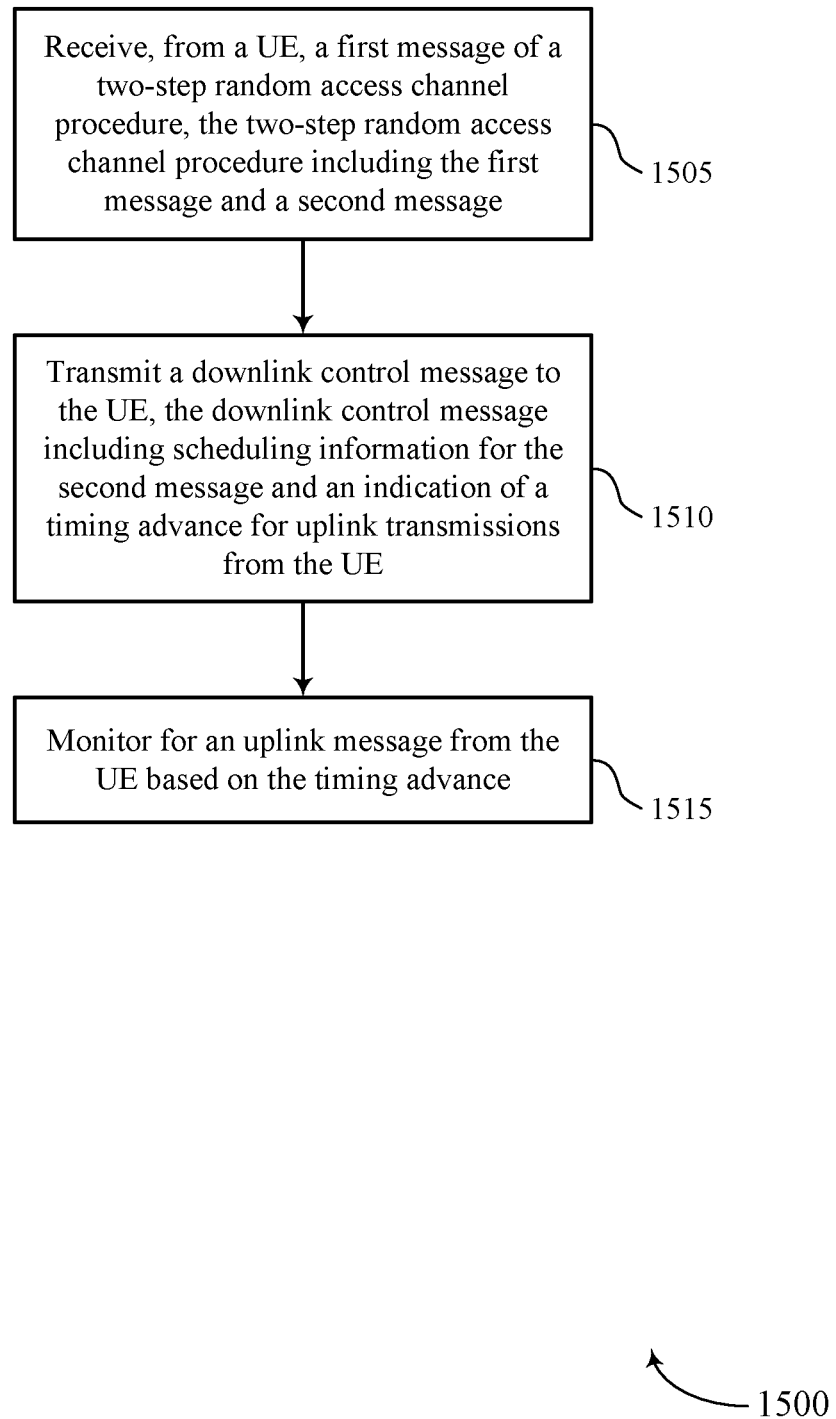

FIG. 15 shows a flowchart illustrating a method 1500 that supports timing indication for a two-step RACH procedure in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive, from a UE, a first message of a two-step RACH procedure, the two-step RACH procedure including the first message and a second message. The operations of 1505 may be performed according to the methods described herein. In some examples, aspects of the operations of 1505 may be performed by an access request receiver as described with reference to FIGS. 9 through 12.

At 1510, the base station may transmit a downlink control message to the UE, the downlink control message including scheduling information for the second message and an indication of a timing advance for uplink transmissions from the UE. The operations of 1510 may be performed according to the methods described herein. In some examples, aspects of the operations of 1510 may be performed by a downlink control transmitter as described with reference to FIGS. 9 through 12.

At 1515, the base station may monitor for an uplink message from the UE based on the timing advance. The operations of 1515 may be performed according to the methods described herein. In some examples, aspects of the operations of 1515 may be performed by an uplink monitor as described with reference to FIGS. 9 through 12.

Figure 16:
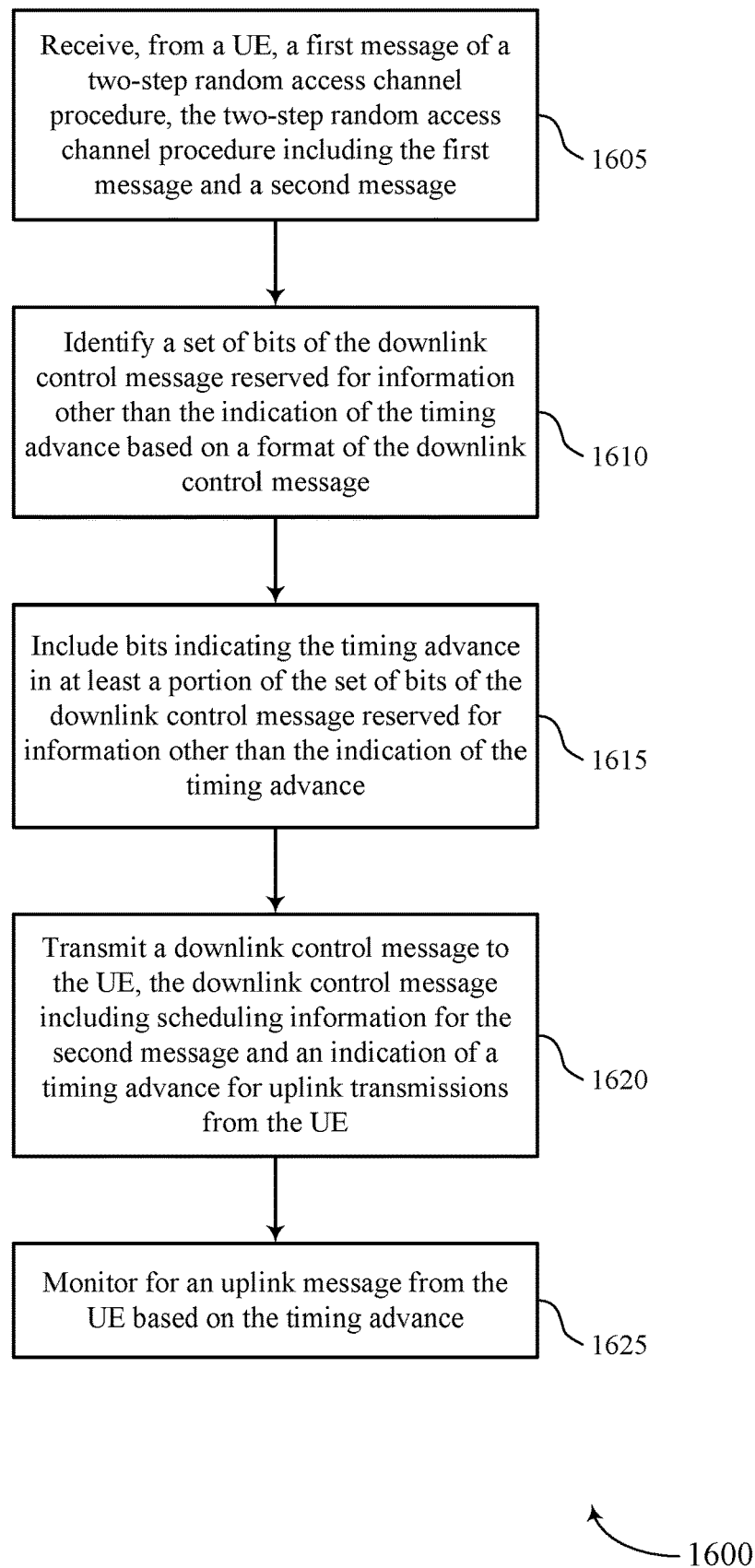

FIG. 16 shows a flowchart illustrating a method 1600 that supports timing indication for a two-step RACH procedure in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE, a first message of a two-step RACH procedure, the two-step RACH procedure including the first message and a second message. The operations of 1605 may be performed according to the methods described herein. In some examples, aspects of the operations of 1605 may be performed by an access request receiver as described with reference to FIGS. 9 through 12.

At 1610, the base station may identify a set of bits of the downlink control message reserved for information other than the indication of the timing advance based on a format of the downlink control message. The operations of 1610 may be performed according to the methods described herein. In some examples, aspects of the operations of 1610 may be performed by a bit manager as described with reference to FIGS. 9 through 12.

At 1615, the base station may include bits indicating the timing advance in at least a portion of the set of bits of the downlink control message reserved for information other than the indication of the timing advance. The operations of 1615 may be performed according to the methods described herein. In some examples, aspects of the operations of 1615 may be performed by a bit manager as described with reference to FIGS. 9 through 12.

At 1620, the base station may transmit a downlink control message to the UE, the downlink control message including scheduling information for the second message and an indication of a timing advance for uplink transmissions from the UE. The operations of 1620 may be performed according to the methods described herein. In some examples, aspects of the operations of 1620 may be performed by a downlink control transmitter as described with reference to FIGS. 9 through 12.

At 1625, the base station may monitor for an uplink message from the UE based on the timing advance. The operations of 1625 may be performed according to the methods described herein. In some examples, aspects of the operations of 1625 may be performed by an uplink monitor as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting a first message of a two-step random access channel procedure, the two-step random access channel procedure comprising the first message and a second message;
    receiving a downlink control message, the downlink control message comprising scheduling information for the second message and an indication for feedback information for the second message, the indication for feedback information for the second message comprising a feedback timing indicator;
    receiving the second message after receiving the downlink control message and based at least in part on the downlink control message comprising the scheduling information; and
    transmitting a feedback message for the second message based at least in part on the downlink control message comprising the indication for feedback information.

2. The method of claim 1, further comprising:
    determining a transmission timing for an uplink message based at least in part on an indication of a timing advance; and
    transmitting the uplink message according to the transmission timing.

3. The method of claim 2, further comprising:
    identifying a set of bits of the downlink control message reserved for information other than the indication of the timing advance based at least in part on a format of the downlink control message, wherein at least a portion of the set of bits includes bits indicating the timing advance.

4. The method of claim 3, wherein the set of bits corresponds to one or more of a downlink control information (DCI) format identifier, a new data indicator, a redundancy version, a hybrid automatic repeat request (HARD) process number, a downlink assignment index, a transmission power control command, uplink control resource information, the feedback timing indicator, or any combination thereof.

5. The method of claim 1, further comprising:
receiving the downlink control message based at least in part on a cell radio network temporary identifier (C-RNTI) associated with the UE.

6. The method of claim 1, further comprising:
transmitting an uplink message, the uplink message comprising the feedback message for the second message, wherein the downlink control message further comprises physical uplink control channel (PUCCH) resource information.

7. The method of claim 6, further comprising:
transmitting the feedback message for the second message based at least in part on the receiving of the second message, wherein the feedback message is transmitted in a PUCCH via resources indicated by the PUCCH resource information or the feedback message is transmitted in a physical uplink shared channel (PUSCH) via resources indicated by an uplink grant included in the second message.

8. The method of claim 1, wherein the downlink control message further comprises an indication of a timing advance for uplink transmission from the UE, the method further comprising:
identifying remaining minimum system information (RMSI) for the UE, wherein the RMSI indicates a granularity for the indication of the timing advance in the downlink control message.

9. The method of claim 1, wherein the downlink control message further comprises an indication of a timing advance for uplink transmissions from the UE, and wherein the indication of the timing advance indicates that the timing advance is to be included in the second message or indicates a relative timing advance with respect to a previous timing advance for the UE.

10. The method of claim 1, further comprising:
identifying a set of resources for transmission of the second message based at least in part on the scheduling information received in the downlink control message;
monitoring the set of resources for the second message based at least in part on the scheduling information;
determining a decoding failure of the second message based at least in part on monitoring the set of resources and the scheduling information; and
refraining from performing an additional random access channel procedure based at least in part on the decoding failure and the scheduling information.

11. The method of claim 1, further comprising:
transmitting the feedback message corresponding to a downlink control channel associated with the downlink control message.

12. The method of claim 1, wherein the indication for feedback information comprises a resource indication for feedback.

13. The method of claim 1, wherein the downlink control message comprises downlink control information (DCI), the DCI comprising the indication for feedback information.

14. The method of claim 13, wherein the DCI further comprises fields corresponding to one or more of: a DCI format identifier, a new data indicator, a redundancy version, a hybrid automatic repeat request (HARQ) process number, a downlink assignment index, a transmission power control command, and uplink control resource information.

15. A method for wireless communications at a network device, comprising:
receiving a first message of a two-step random access channel procedure for a user equipment (UE), the two-step random access channel procedure comprising the first message and a second message;
transmitting a downlink control message, the downlink control message comprising scheduling information for the second message and an indication for feedback information for the second message, the indication for feedback information for the second message comprising a feedback timing indicator;
transmitting the second message of the two-step random access channel procedure for the UE after transmitting the downlink control message and based at least in part on the downlink control message comprising the scheduling information; and
monitoring for a feedback message for the second message based at least in part on the downlink control message comprising the indication for feedback information.

16. The method of claim 15, further comprising:
identifying a set of bits of the downlink control message reserved for information other than an indication of a timing advance based at least in part on a format of the downlink control message; and
including bits indicating the timing advance in at least a portion of the set of bits of the downlink control message reserved for information other than the indication of the timing advance.

17. The method of claim 15, further comprising:
transmitting the downlink control message based at least in part on a cell radio network temporary identifier (C-RNTI) associated with the UE.

18. The method of claim 15, wherein the downlink control message comprises physical uplink control channel (PUCCH) resource information.

19. The method of claim 18, further comprising:
receiving the feedback message for the second message in a PUCCH via resources indicated by the PUCCH resource information or in a physical uplink shared channel (PUSCH) via resources indicated by an uplink grant included in the second message.

20. The method of claim 15, wherein the downlink control message further comprises an indication of a timing advance for uplink transmissions from the UE, the method further comprising:
transmitting remaining minimum system information (RMSI) for the UE, wherein the RMSI indicates a granularity for the indication of the timing advance in the downlink control message.

21. The method of claim 15, wherein the downlink control message further comprises an indication of a timing advance for uplink transmissions from the UE, and wherein the indication of the timing advance indicates that the timing advance is to be included in the second message.

22. The method of claim 21, further comprising:
transmitting the second message including the indication of the timing advance.

23. The method of claim 15, wherein the downlink control message further comprises an indication of a timing advance for uplink transmissions from the UE, and wherein the indication of the timing advance indicates a relative timing advance with respect to a previous timing advance for the UE.

24. The method of claim 15, wherein the downlink control message comprises downlink control information (DCI), the DCI comprising the indication for feedback information.

25. The method of claim 24, wherein the DCI further comprises fields corresponding to one or more of: a DCI format identifier, a new data indicator, a redundancy version, a hybrid automatic repeat request (HARQ) process number, a downlink assignment index, a transmission power control command, and uplink control resource information.

26. An apparatus for wireless communications at a user equipment (UE), comprising:
a memory, and
a processor coupled with the memory, the processor being configured to:
transmit a first message of a two-step random access channel procedure, the two-step random access channel procedure comprising the first message and a second message;
receive a downlink control message, the downlink control message comprising scheduling information for the second message and an indication for feedback information for the second message, the indication for feedback information for the second message comprising a feedback timing indicator;
receive the second message after receiving the downlink control message and based at least in part on the downlink control message comprising the scheduling information; and
transmit a feedback message for the second message based at least in part on the downlink control message comprising the indication for feedback information.

27. The apparatus of claim 26, wherein the processor is further configured to:
determine a transmission timing for an uplink message based at least in part on an indication of a timing advance; and
transmit the uplink message according to the transmission timing, wherein the uplink message indicates that the two-step random access channel procedure is complete.

28. The apparatus of claim 26, wherein the processor is further configured to:
identify a set of bits of the downlink control message reserved for information other than an indication of a timing advance based at least in part on a format of the downlink control message, wherein at least a portion of the set of bits includes bits indicating the timing advance.

29. The apparatus of claim 28, wherein the set of bits corresponds to one or more of a downlink control information (DCI) format identifier, a new data indicator, a redundancy version, a hybrid automatic repeat request (HARD) process number, a downlink assignment index, a transmission power control command, uplink control resource information, the feedback timing indicator, or any combination thereof.

30. The apparatus of claim 26, wherein the processor is further configured to:
receive the downlink control message based at least in part on a cell radio network temporary identifier (C-RNTI) associated with the UE.

31. The apparatus of claim 26, wherein the processor is further configured to:
transmit an uplink message comprising the feedback message for the second message, wherein the downlink control message further comprises physical uplink control channel (PUCCH) resource information.

32. The apparatus of claim 31, wherein the processor is further configured to:
transmit the feedback message for the second message based at least in part on the receiving of the second message, wherein the feedback message is transmitted in a PUCCH via resources indicated by the PUCCH resource information or the feedback message is transmitted in a physical uplink shared channel (PUSCH) via resources indicated by an uplink grant included in the second message.

33. The apparatus of claim 26, wherein the downlink control message further comprises an indication of a timing advance for uplink transmission from the UE, and wherein the processor is further configured to:
identify remaining minimum system information (RMSI) for the UE, wherein the RMSI indicates a granularity for the indication of the timing advance in the downlink control message.

34. The apparatus of claim 26, wherein the downlink control message further comprises an indication of a timing advance for uplink transmissions from the UE, the indication of the timing advance indicates that the timing advance is to be included in the second message or indicates a relative timing advance with respect to a previous timing advance for the UE.

35. The apparatus of claim 26, wherein the processor is further configured to:
identify a set of resources for transmission of the second message based at least in part on the scheduling information received in the downlink control message;
monitor the set of resources for the second message based at least in part on the scheduling information;
determine a decoding failure of the second message based at least in part on monitoring the set of resources and the scheduling information; and
refrain from performing an additional random access channel procedure based at least in part on the decoding failure and the scheduling information.

36. The apparatus of claim 26, wherein the processor is further configured to:
transmit the feedback message corresponding to a downlink control channel associated with the downlink control message.

37. The apparatus of claim 26, wherein the indication for feedback information comprises a resource indication for feedback.

38. The apparatus of claim 26, wherein the downlink control message comprises downlink control information (DCI), the DCI comprising the indication for feedback information.

39. The apparatus of claim 38, wherein the DCI further comprises fields corresponding to one or more of: a DCI format identifier, a new data indicator, a redundancy version, a hybrid automatic repeat request (HARD) process number, a downlink assignment index, a transmission power control command, and uplink control resource information.

40. An apparatus for wireless communications at a network device, comprising:
a memory, and
a processor coupled with the memory, the processor being configured to:
receive a first message of a two-step random access channel procedure for a user equipment (UE), the two-step random access channel procedure comprising the first message and a second message;
transmit a downlink control message, the downlink control message comprising scheduling information for the second message and an indication for feedback information for the second message, the indication for feedback information for the second message comprising a feedback timing indicator;
transmit the second message of the two-step random access channel procedure for the UE after transmitting the downlink control message and based at least in part on the downlink control message comprising the scheduling information; and
monitor for a feedback message for the second message based at least in part on the downlink control message comprising the indication for feedback information.

41. The apparatus of claim 40, wherein the processor is further configured to:
identify a set of bits of the downlink control message reserved for information other than an indication of a timing advance based at least in part on a format of the downlink control message; and
include bits indicating the timing advance in at least a portion of the set of bits of the downlink control message reserved for information other than the indication of the timing advance.

42. The apparatus of claim 40, wherein, to transmit the downlink control message, the processor is configured to:
transmit the downlink control message based at least in part on a cell radio network temporary identifier (C-RNTI) associated with the UE.

43. The apparatus of claim 40, wherein the downlink control message comprises physical uplink control channel (PUCCH) resource information.

44. The apparatus of claim 40, wherein the downlink control message further comprises an indication of a timing advance for uplink transmissions from the UE, and wherein the processor is further configured to:
transmit remaining minimum system information (RMSI) for the UE, wherein the RMSI indicates a granularity for the indication of the timing advance in the downlink control message.

45. The apparatus of claim 40, wherein the downlink control message further comprises an indication of a timing advance for uplink transmissions from the UE, the indication of the timing advance indicates that the timing advance is to be included in the second message.

46. The apparatus of claim 45, wherein the processor is further configured to:
transmit the second message including the indication of the timing advance.

47. The apparatus of claim 40, wherein the downlink control message further comprises an indication of a timing advance for uplink transmissions from the UE, the indication of the timing advance indicates a relative timing advance with respect to a previous timing advance for the UE.

48. The apparatus of claim 40, wherein the downlink control message comprises downlink control information (DCI), the DCI comprising the indication for feedback information.

49. The apparatus of claim 48, wherein the DCI further comprises fields corresponding to one or more of: a DCI format identifier, a new data indicator, a redundancy version, a hybrid automatic repeat request (HARD) process number, a downlink assignment index, a transmission power control command, and uplink control resource information.

\* \* \* \* \*